US012767257B2

(12) United States Patent
Dunlap et al.

(10) Patent No.: US 12,767,257 B2
(45) Date of Patent: Oct. 20, 2026

(54) HEIGHT ADJUSTABLE SEAT POSTS FOR BICYCLES

(71) Applicant: SRAM, LLC, Chicago, IL (US)

(72) Inventors: Charles Dunlap, Colorado Springs, CO (US); Brian Jordan, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 507 days.

(21) Appl. No.: 18/333,822

(22) Filed: Jun. 13, 2023

(65) Prior Publication Data

US 2024/0417013 A1 Dec. 19, 2024

(51) Int. Cl.
*B62J 1/08* (2006.01)

(52) U.S. Cl.
CPC ............ *B62J 1/08* (2013.01); *B62J 2001/085* (2013.01)

(58) Field of Classification Search
CPC ....... B62J 1/08; B62J 2001/085; B62K 25/08; B62K 2025/045; B62K 2025/047; B62K 19/36; F16F 9/0272; F16F 9/3482
See application file for complete search history.

(56) References Cited

U.S. PATENT DOCUMENTS 5,101,923 A * 4/1992 Odagi .................. B60G 17/033 180/219
7,163,223 B2 1/2007 Wesling
9,422,018 B2 8/2016 Pelot
11,964,722 B2 * 4/2024 Staples ...................... B62J 1/08
2006/0175792 A1 * 8/2006 Sicz .......................... B62J 1/08 280/200
2018/0001953 A1 * 1/2018 Winefordner ............. B62J 1/08
2019/0186583 A1 6/2019 Davies
2020/0023918 A1 * 1/2020 Shirai ........................ B62J 1/08
2022/0252163 A1 * 8/2022 Coaplen .................. F16K 5/061
2023/0023599 A1 * 1/2023 Coaplen ................... B62J 43/30
2023/0234661 A1 * 7/2023 Holaday .................... B62J 1/08 297/215.13
2025/0115323 A1 * 4/2025 Chambers .................. B62J 1/08

FOREIGN PATENT DOCUMENTS

EP 3245121 4/2020
TW I664109 7/2019

* cited by examiner

*Primary Examiner* — Valentin Neacsu
*Assistant Examiner* — Marlon A Arce

(57) ABSTRACT

Height adjustable seat posts for bicycles are described herein. An example height adjustable seat post includes an upper tube and a lower tube configured in a telescopic arrangement and a piston in the upper tube. The piston divides the upper tube into first chamber and second chambers. The first and second chambers are filled with fluid. The height adjustable seat post also includes a valve including a fixed member and a rotatable member forming a face seal between a first face of the fixed member and a second face of the rotatable member. The fixed member has a fluid flow passageway. The rotatable member is rotatable relative to the fixed member between a closed position in which the rotatable member blocks the fluid flow passageway to prevent fluid flow between the first and second chambers and an open position to enable fluid flow through the fluid flow passageway and between the first and second chambers.

21 Claims, 16 Drawing Sheets

HEIGHT ADJUSTABLE SEAT POSTS FOR BICYCLES

FIELD OF THE DISCLOSURE

This disclosure relates generally to bicycle components and, more specifically, to height adjustable seat posts for bicycles.

BACKGROUND

Bicycles are known to have a seat or saddle to support a rider in a seated position. The seat is typically connected to the bicycle frame by a seat post. On most bicycles, the seat post can be manually adjusted to raise or lower the height of the seat to accommodate different riders of different heights. The height may also be adjusted to accommodate different riding conditions. Typically, the seat post is mechanically clamped to a tube of the bicycle frame. When the clamp is released, the seat and post are slidable up and down relative to the tube of the bicycle frame to adjust the height of the seat. On some recent higher end bicycles, the seat post is height adjustable during riding of the bicycle by employing some type of hydraulic assist mechanism. For example, manually actuated hydraulic height adjustable or "dropper" seat posts may use a hydraulic pressure differential within the post and require manual operation to adjust the seat post height. Some products may use ANT+ wireless communication technology allowing the rider to wirelessly adjust the seat height.

SUMMARY

An example height adjustable seat post for a bicycle disclosed herein includes an upper tube and a lower tube configured in a telescopic arrangement. The lower tube is to be coupled to a frame of the bicycle, and the upper tube is to be coupled to a seat. The height adjustable seat post includes a piston in the upper tube. The piston divides the upper tube into a first chamber and a second chamber. The first and second chambers are filled with fluid. The height adjustable seat post also includes a valve including a fixed member and a rotatable member forming a face seal between a first face of the fixed member and a second face of the rotatable member. The fixed member has a fluid flow passageway. The rotatable member is rotatable relative to the fixed member between a closed position in which the rotatable member blocks the fluid flow passageway to prevent fluid flow between the first and second chambers and an open position to enable fluid flow through the fluid flow passageway and between the first and second chambers.

An example bicycle component disclosed herein includes a first tube and a second tube configured in a telescopic arrangement and a piston in the first tube. The piston divides the first tube into a first chamber and a second chamber. The first and second chambers are filled with fluid. The bicycle component also includes a valve operable between a closed state in which the fluid is blocked from flowing across the piston between the first and second chambers to maintain the first and second tubes in position and an open state to enable the fluid to flow across the piston between the first and second chambers to enable the first and second tubes to move toward or away from each other. The valve includes a fixed disc and a rotatable disc disposed in a bore in the piston. The fixed disc has a fixed disc fluid flow passageway extending through the fixed disc in an axial direction. The rotatable disc is rotatable relative to the fixed disc to switch the valve between the closed state and the open state.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

Figure 1:
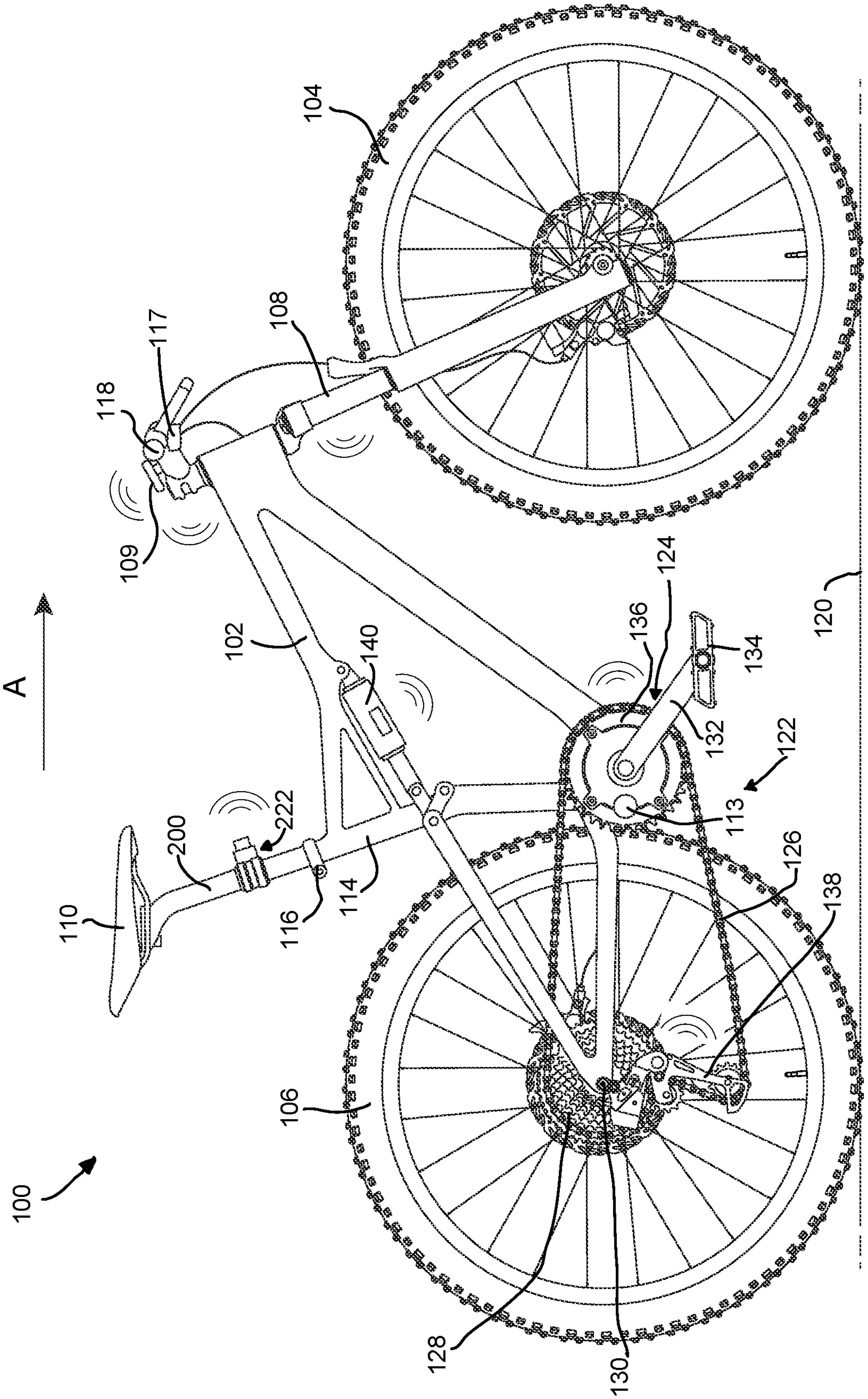
FIG. 1 is a side view of an example bicycle that may employ any of the example height adjustable seat posts disclosed herein.

Descriptors "first," "second," "third," etc. are used herein when identifying multiple elements or components that may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Some modern bicycles include a height adjustable seat post, sometimes referred to as dropper seat post, which allows a rider to change the height of their seat while riding the bicycle. For example, the rider can actuate a seat post actuator on the handlebars and push downward on the seat (e.g., with their bottom), which contracts or compresses the seat post and thereby lowers the height of the seat. When the rider stops actuating the seat post actuator, the seat post is maintained in the contracted position. Then, when the rider desires to raise the seat, the rider can actuate the seat post actuator again and the seat post extends or expands to move the seat back to the original height. This lowering ability can be advantageous when the rider is about to ride the bicycle down a steep decline. For instance, it is often desired to lower the seat when riding down a decline so that the rider can stand up and lean backward without the seat hitting their bottom. This lowering ability can also be used to lower the seat before the rider encounters an incline, where the rider typically stands up and peddles. Adjustable seat posts can be used in other scenarios as well.

Known dropper seat posts rely on hydraulic fluid and/or pneumatic pressure controlled by a mechanically or hydraulically actuated valve to change height. More recently, dropper seat posts have used battery powered motors controlled by an electrical signal to actuate the valve. These motor systems require complex gear systems to create linear motion to actuate the valve. These motor systems also require motor position encoders and monitoring systems to ensure proper valve actuation. Thus, these known motor systems are typically complex to manufacture and can be relatively expensive. Further, these linear-type valves utilize linear movement of a plug or valve member to open and close the valve. This type of valve may also be referred to as a volume displacing valve, because a small volume is changed in the hydraulic chambers of the seat post when the valve state is changed. This requires additional power from the motor system to overcome the pressure differential to open/close the valve.

Disclosed herein are height adjustable seats posts that utilize a motor-operated rotary valve to enable the seat post to expand or contract. The rotary valve can be switched between an open state to enable the seat post to expand or contract and a closed state to close the valve and maintain the seat post in a certain position (corresponding to a certain seat height). The example rotary valves disclosed herein are advantageous because they are non-volume displacing, which means they do not change the volume of the chambers (e.g., pneumatic chambers) when switching between the open and closed states. As such, the motor does not need to provide additional power to overcome a pressure differential across the valve when opening/closing the valve. This reduces the amount of power required by the motor to operate the valve. Further, the example motor-operated rotary valves disclosed herein are advantageous because they do not require position monitoring as seen in known dropper seat posts. This greatly reduces manufacturing complexity and costs.

An example height adjustable seat post disclosed herein includes an upper tube and a lower tube that are configured in a telescopic arrangement. The lower tube is coupled or mounted to the bicycle frame, and the seat is coupled to the upper tube. The upper tube can slide relative to the lower tube to adjust the height of the seat. The upper tube is sealed on both ends and forms a pneumatic chamber filled with a pressurized gas (e.g., air, nitrogen). The seat post includes a shaft coupled to the lower tube and extending into the upper tube. The seat post includes a piston assembly disposed in the upper tube and coupled to the shaft. The piston assembly includes a piston that divides the pneumatic chamber into an upper pneumatic chamber or positive gas chamber and a lower pneumatic chamber or a negative gas chamber. The positive gas chamber biases the upper and lower tubes away from each other and the negative gas chamber biases the upper and lower tubes toward each other. The piston assembly is generally located in a region of overlap between the upper and lower tubes. The seat post also includes a rotary valve (which may also be referred to as a rotating disc valve) that controls the flow of gas across the piston and between the upper and lower pneumatic chambers. The seat post also includes a motor to operate the rotary valve between a closed state and an open state. When the rotary valve is in the closed, the valve blocks or prevents gas flow between the two chambers. With respect to the terms block or prevent, for purposes of the following discussion, the terms block or prevent refer to the most restricted gas flow attainable or desirable. Thus, in one example, the terms block or prevent means a stoppage of all gas flow between the two chambers. However, in another example, the terms block or prevent means substantially all gas flow is stopped between the two chambers. The pressure in the upper pneumatic chamber is sufficient to support the weight of the rider. When it is desired to raise or lower the seat, the motor is activated to open the rotary valve. When the valve is opened, gas can flow across the piston between the upper and lower pneumatic chambers. This enables the rider to move the upper tube upward or downward relative to the lower tube, thereby raising or lowering the height of the seat. When a desired seat position is reached, the motor is activated to close the valve, which maintains the seat post in its current position.

The example rotary valves disclosed herein include a rotatable flow control member, such as a rotatable disc, that can be rotated relative to a fixed member, such as a fixed disc, to switch the valve between the open and closed states. In some examples, the fixed disc and the rotatable disc are arranged and pressed together to form a face seal. The rotatable disc can be rotated between a closed position to block fluid flow through one or more openings in the fixed disc and an open position to allow fluid flow through the opening(s) in the fixed disc (in an axial direction). In some examples, the fixed disc and the rotatable disc are composed of a relatively hard material, such as ceramic (e.g., aluminum oxide). This enables the two discs to be pressed tightly together to form a relatively tight sealing interface. In some examples, the seat post includes a motor assembly with a motor to rotate the rotatable disc between the open position and the closed position. In other examples the seat post can include a solenoid or other type of actuator to operate the valve. As disclosed above, rotary valves are advantageous because they are non-volume displacing, which means they do not change the volume of the chambers when switching between the open and closed states. This reduces the amount of power used by the motor to operate the valve. Further, rotary valves are self-latching, meaning they remain in the open or closed state after the motor is deactivated. This further reduces the amount of power needed by the assembly to operate the valve.

In some examples disclosed herein the motor assembly with the motor is coupled to a lower end of the lower tube. In such examples, the seat post includes a valve rod extending through the shaft between the motor assembly and the valve in the piston assembly. The motor can be activated to rotate the valve rod and control the state of valve. In some instances, this position of the motor is advantageous because it enables the motor to be physically larger (e.g., with a larger diameter). In some examples, the seat post includes a control module with a power supply (e.g., a battery) to operate (e.g., activate or deactivate) the motor. In some examples, the control module with the power supply is coupled to an outer surface of the lower tube, such as at or near the collar at the upper end of the lower tube. In some examples disclosed herein, the seat post includes a network for wires and/or electrical connectors that electrically connect the control module, which is disposed outside of the tubes, to the motor, which is coupled to the bottom of the seat post. In other examples disclosed herein, the motor assembly is coupled to or integrated with the piston assembly in the upper tube. As such, the motor assembly is disposed in or near the region of overlap between the upper tube and the lower tube. The seat post can include additional wires that extend through the shaft to electrically couple the control module to the motor.

Turning now to the figures, FIG. 1 illustrates one example of a human powered vehicle on which the example seat posts disclosed herein can be implemented. In this example, the vehicle is one possible type of bicycle 100, such as a mountain bicycle. In the illustrated example, the bicycle 100 includes a frame 102 and a front wheel 104 and a rear wheel 106 rotatably coupled to the frame 102. In the illustrated example, the front wheel 104 is coupled to the front end of the frame 102 via a front fork 108. A front and/or forward riding direction or orientation of the bicycle 100 is indicated by the direction of the arrow A in FIG. 1. As such, a forward direction of movement for the bicycle 100 is indicated by the direction of arrow A.

In the illustrated example of FIG. 1, the bicycle 100 includes a seat 110 (sometimes referred to as a saddle) coupled to the frame 102 (e.g., near the rear end of the frame 102 relative to the forward direction A) via a seat post 200 constructed in accordance with the teachings of the present disclosure. In particular, the seat post assembly 200 is coupled to a seat tube 114 of the frame 102. In some examples, the seat post 200 is coupled to the seat tube 114 by a clamp 116. The seat post 200 is height adjustable to raise or lower the seat 110. Example height adjustable seat posts are disclosed in further detail herein. The bicycle 100 also includes handlebars 118 coupled to the frame 102 and the front fork 108 (e.g., near a forward end of the frame 102 relative to the forward direction A) for steering the bicycle 100. The bicycle 100 is shown on a riding surface 120. The riding surface 120 may be any riding surface such as the ground (e.g., a dirt path, a sidewalk, a street, etc.), a man-made structure above the ground (e.g., a wooden ramp), and/or any other surface.

In the illustrated example, the bicycle 100 has a drivetrain 122 that includes a crank assembly 124. The crank assembly 124 is operatively coupled via a chain 126 to a sprocket assembly 128 mounted to a hub 130 of the rear wheel 106. The crank assembly 124 includes at least one, and typically two, crank arms 132 and pedals 134, along with at least one front sprocket, or chainring 136. A rear gear change device 138, such as a derailleur, is disposed at the rear wheel 106 to move the chain 126 between different sprockets of the sprocket assembly 128. Additionally or alternatively, the bicycle 100 may include a plurality of front chainrings and a front gear change device to move the chain 126 between the plurality of chainrings.

The example bicycle 100 can include a suspension system having one or more suspension components. In the illustrated example, the bicycle 100 includes a rear suspension component 140. In this example, the suspension component 140 is implemented as or includes a shock absorber, referred to herein as the shock absorber 140. In some examples, the front fork 108 is also implemented as a front suspension component. For example, a spring can be integrated into one of the legs and a damper can be integrated into the other leg. Therefore, the front fork 108 and the shock absorber 140 absorb shocks and vibrations while riding the bicycle 100 (e.g., when riding over rough terrain). In other examples, the front fork 108 and/or the shock absorber 140 may be integrated into the bicycle 100 in other configurations or arrangements.

While the example bicycle 100 depicted in FIG. 1 is a type of mountain bicycle, the example seat posts disclosed herein can be implemented on other types of bicycles. For example, the example seat posts disclosed herein may be used on road bicycles, as well as bicycles with mechanical (e.g., cable, hydraulic, pneumatic, etc.) and non-mechanical (e.g., wired, wireless) drive systems. The example seat posts disclosed herein may also be implemented on other types of two-wheeled, three-wheeled, and four-wheeled human powered vehicles. Further, the example seat posts disclosed herein can be used on other types of vehicles, such as motorized vehicles (e.g., a motorcycle).

A control device or bicycle computer 109 is mounted to the stem of the handlebars 118. The bicycle computer 109 may wirelessly communicate with the seat post 200, rear derailleur 138, the front suspension fork 108, and/or the rear suspension 140 to collect data and/or control the components. The bicycle computer 109 may also wirelessly communicate with a power meter 113 of the crank assembly 124. The foregoing components may be paired to a wireless network.

Figure 2:
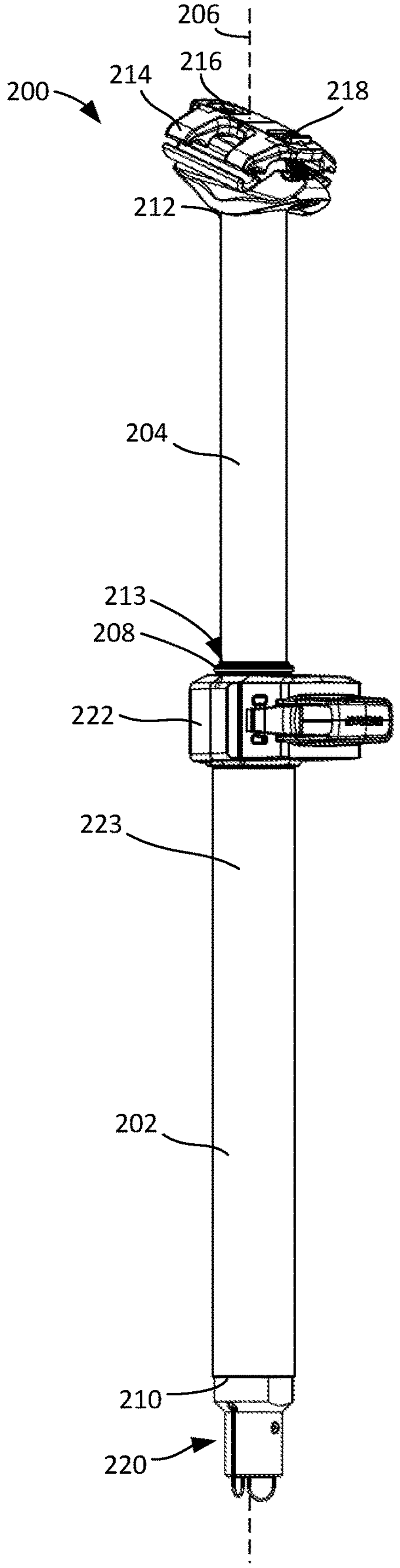
FIG. 2 is a side view of an example height adjustable seat post in a fully extended position.

FIG. 2 is a perspective view of the example height adjustable seat post 200 that is implemented on the bicycle 100 of FIG. 1. The seat post 200 can also be referred to as a dropper seat post or seat post assembly. The length or height of the example seat post 200 is adjustable so that the height of the seat 110 (FIG. 1) can be raised or lowered. In the illustrated example, the seat post 200 includes a first tube 202, referred to herein as a lower tube 202, and a second tube 204, referred to herein as an upper tube 204. The lower and upper tubes 202, 204 may also be referred to as seat post portions or segments. As shown in FIG. 2, the lower and upper tubes 202, 204 are configured in a coaxial arrangement and aligned along an axis 206. The axis 206 corresponds to a central or longitudinal axis of the seat post 200. The lower tube 202 has a first end 208, referred to herein as an upper end 208, and a second end 210, referred to herein as a lower end 210, opposite the upper end 208. The upper tube 204 similarly has a first end 212, referred to herein as an upper end 212, and a second end 500 (shown in FIGS. 5 and 6), referred to herein as a lower end 500, opposite the upper end 212. The upper tube 204 extends into an opening 213 in the upper end 208 of the lower tube 202. As such, the upper tube 204 is at least partially disposed in the lower tube 202. The upper tube 204 is slidable into and out of the opening 213 in the lower tube 202. Therefore, the upper tube 204 and the lower tube 202 are configured in a telescopic arrangement. In other examples the tubes 202, 204 can be configured such that the lower tube 202 extends into the lower end 500 of the upper tube 204.

In the illustrated example, the seat post 200 includes a seat clamp 214 coupled (e.g., welded, bolted, etc.) to the upper end 212 of the upper tube 204. The seat clamp 214 is used to couple the seat 110 (FIG. 1) to the seat post 200. In this example, the seat clamp 214 includes two threaded fasteners 216, 218 (e.g., bolts) that can be tightened to secure the seat 110 to the upper tube 204. In other examples, the seat post 200 can include other mechanisms for attaching to the seat 110. In the illustrated example, the seat post 200 includes a motor assembly 220 coupled to the lower end 210 of the lower tube 202. The motor assembly 220 may also be referred to as an end cap on the lower end 210 of the lower tube 202.

Figure 3:
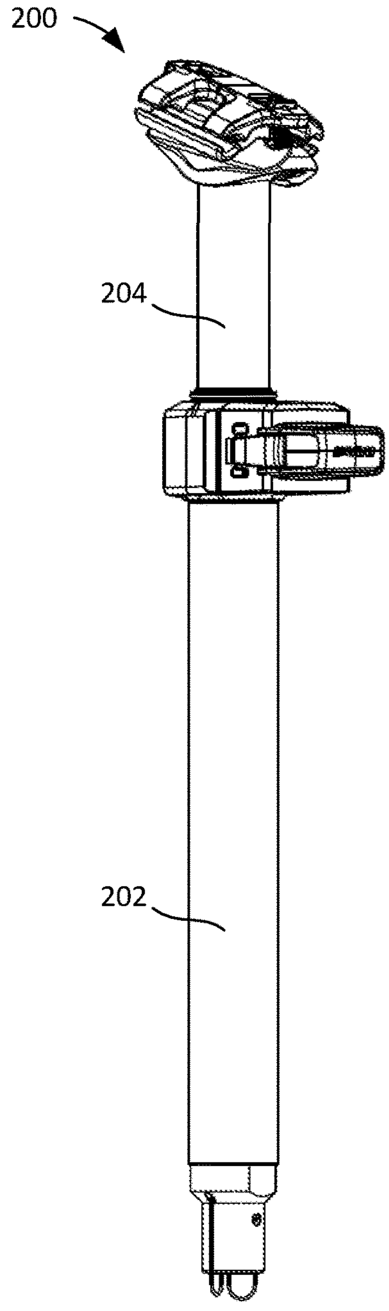
FIG. 3 is a side view of the example height adjustable seat post of FIG. 2 in a partially contracted position.

When the seat post 200 is installed on the bicycle 100 (FIG. 1), the lower tube 202 is coupled to the frame 102 (FIG. 1). For example, the lower tube 202 can be inserted into the seat tube 114 (FIG. 1) and secured by the clamp 116 (FIG. 1). The upper tube 204 extends upward from the lower tube 202 and supports the seat 110 (FIG. 1). As disclosed in further detail herein, the seat post 200 has an internal valve system that enables the upper tube 204 to move (e.g., slide) downward relative to the lower tube 202 and provides rebounding force to move the upper tube 204 upward relative to the lower tube 202. This enables a rider to easily lower the height of the seat 110. The seat post 200 is adjustable between a fully extended position (sometimes referred to as a top-out position), shown in FIG. 2, and a fully contracted position in which the upper tube 204 is moved into the lower tube 202 until a stop or limit is reached. The seat post 200 can also be expanded/contracted to any position between the fully extended position and the fully contracted position and maintained in place. For example, FIG. 3 shows an example in which the upper tube 204 has been partially moved into the lower tube 202. As such, the seat 110 (FIG. 1) would be lowered or closer to the ground.

In the illustrated example of FIG. 2, the seat post 200 includes a control module 222. The control module 222 includes a power supply (e.g., a battery) and circuitry (e.g., processor circuitry, logic circuitry, etc.) to operate the internal valve system. In this example, the control module 222 is coupled to an outer surface 223 of the lower tube 202 at or near the upper end 208 of the lower tube 202. Some known dropper posts locate the control module on the seat clamp. However, this location can interfere with the rear tire clearance. Therefore, locating the control module 222 at the upper end of the lower tube 202, adjacent the overlap region, can be advantageous to improve rear wheel clearance. This location also helps maintain a minimal ratio of drop height to overall length.

As an example operation, if a rider desires to lower the seat 110 (FIG. 1), the rider actuates a seat post actuator, in the example, a seat post actuation button 117 on the handlebars 118 (FIG. 1). Alternatively, the seat post actuation button may be a lever or other type of user interface such a display device with a touch screen. The control module 222 receives a signal (e.g., a wireless signal) from the seat post actuation button 117 and activates the internal valve system to open an internal valve in the pneumatic chamber in the upper tube 204, as disclosed in further detail herein. While the internal valve is open, the rider can push downward on the seat 110, which slides the upper tube 204 into the lower tube 202, as shown in the position of FIG. 3. In some examples, the rider can apply this force by sitting on the seat 110 and applying the downward force with their bottom. When the seat 110 reaches the desired height, the rider can release the button on the handlebars 118. The control module 222 closes the internal valve, which maintains the upper tube 204 in place relative to the lower tube 202. When the rider desires to raise the seat 110, the rider can press the seat post actuation button 117. The control module 222 receives the signal and opens the internal valve. When little or no downward force is acting on the seat 110, the internal pneumatic system pushes the upper tube 204 upward from the lower tube 202, thereby moving the seat 110 upward. When the desired position is reached, the rider can release the seat post actuation button 117, which causes the internal valve to close and holds the seat post 200 in the current position.

In some examples, to activate the internal valve system, the rider pushes and holds the seat post actuation button 117. As long as the seat post actuation button 117 is depressed, the valve is held in the open state, which enables the upper tube 204 to slide upward or downward relative to the lower tube 202. When the rider releases the seat post actuation button 117, the interval valve is closed, which maintains the upper tube 204 in place. However, in other examples, the system can be configured such that the rider may press the button and release the button to cause the valve to open, and then the rider presses the button a second time to close the valve.

Figure 4:
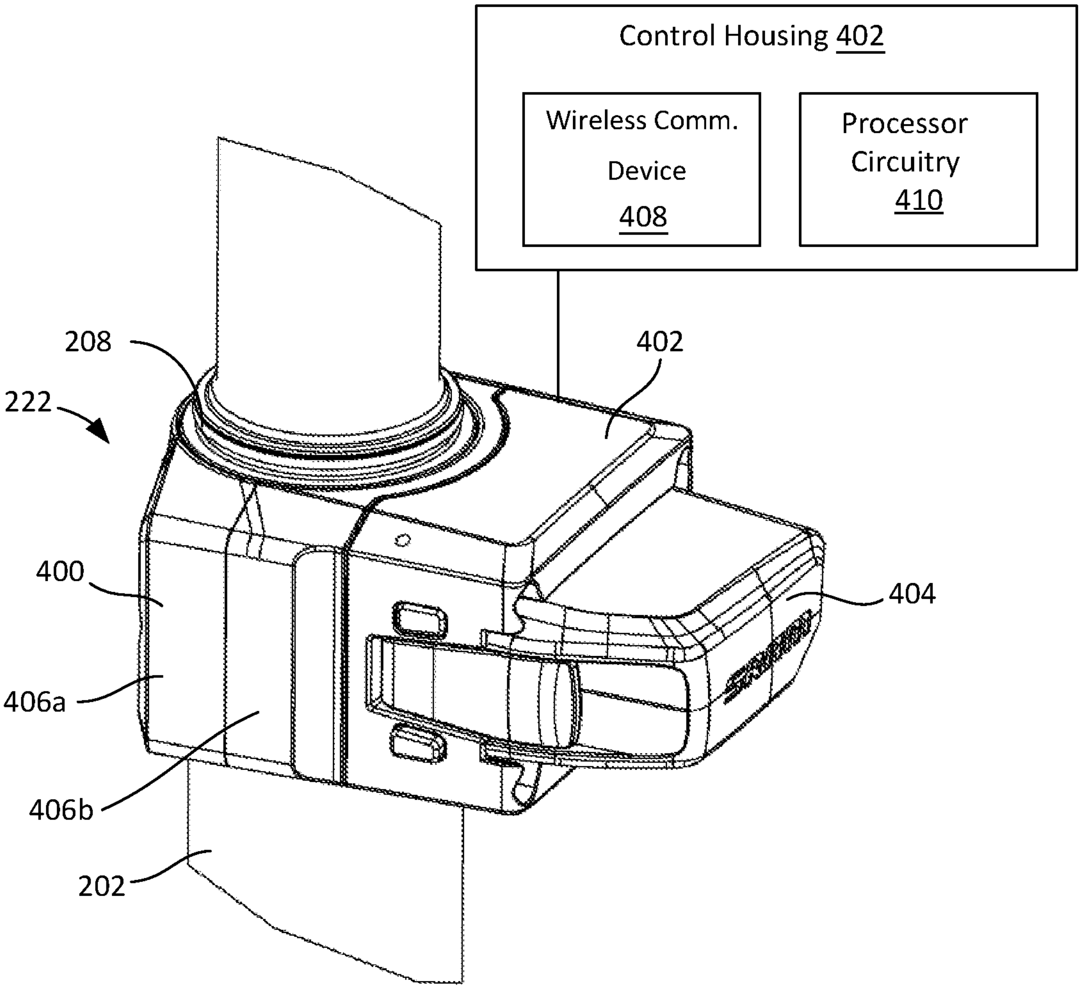
FIG. 4 is an enlarged view of an example control module that can be implemented on the example height adjustable seat post of FIG. 2.

FIG. 4 is an enlarged view the control module 222. In the illustrated example, the control module 222 includes a collar 400, a control housing 402 coupled to the collar 400, and a power supply, in this example a battery 404 coupled to the control housing 402. The collar 400 is wrapped around the lower tube 202 and is used to couple the control module 222 to the lower tube 202. In this example, the collar 400 includes a first portion 406*a* and a second portion 406*b* that are coupled together and therefore clamped around the lower tube 202. In some examples the first and second portions 402*a*, 402*b* are coupled by a snap-fit and/or threaded fasteners (e.g., screws, bolts, etc.). The control housing 402 contains electronic components for receiving control signals and operating the internal valve system (e.g., opening the valve, closing the valve, etc.). For example, FIG. 4 shows a block diagram of the control housing 402. The control housing 402 includes processor circuitry 410 and a wireless communication device 408 which includes a receiver and may also include transmitter. The wireless communication device 408 can receive wireless control/command signals from the seat post actuation button 117 and may send wireless control/command signals to the seat post actuation button 117 or the bicycle components such as the bicycle computer 109. In response to receiving a command, for example, the processor circuitry 410 activates a motor (e.g., by applying a current or voltage to the motor) in the motor assembly 220 to open the valve in the upper tube 204 to enable the seat post 200 to expand or contract. When the seat post actuation button 117 is released, no control/command signals are received and the processor circuitry 410 activates the motor to close the valve, thereby maintaining the seat post 200 in position. In other examples, a second or separate control/command signal is received when the seat post actuation button is released. The communication device is configured to communicate wirelessly, and as such includes one or more antennae. The communication device provides for wireless communication in any known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Bluetooth®, ANT+™, ZigBee, WiFi and/or AIREA™ standards may also, or alternatively, be used. Accordingly, replacement standards and protocols having the same or similar functions as those disclosed herein are considered equivalents thereof.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

In the illustrated example of FIG. 4, the electronic components of the control housing 402 receive power from the battery 404. The battery 404 supplies power to energize or activate a motor of the motor assembly 220 (FIG. 2). In some examples, the battery 404 is removeable. For example, the battery 404 can be removed, charged, and reattached to the control housing 402. In other examples, the battery 404 can be charged while the battery 404 is attached to the control housing 402. In other examples, the battery 404 may not be rechargeable and must be replaced with a new battery. Therefore, in this example, the power supply for powering the motor is attached to the collar 400 at the upper end 208 of the lower tube 202. The battery 404 is fixed relative to the lower tube 202 (via the collar 400), and fixed relative to the lower tube 202 when installed on the bicycle 100 (FIG. 1).

Figure 5:
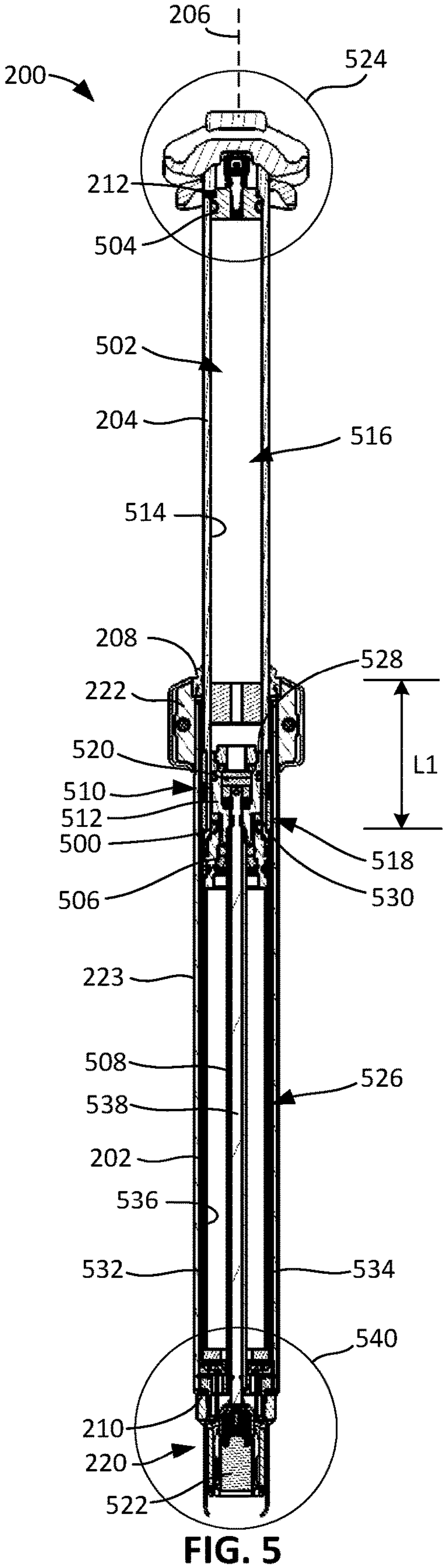
FIG. 5 is a cross-sectional view of the example height adjustable seat post of FIG. 2 in the fully extended position.
Figure 6:
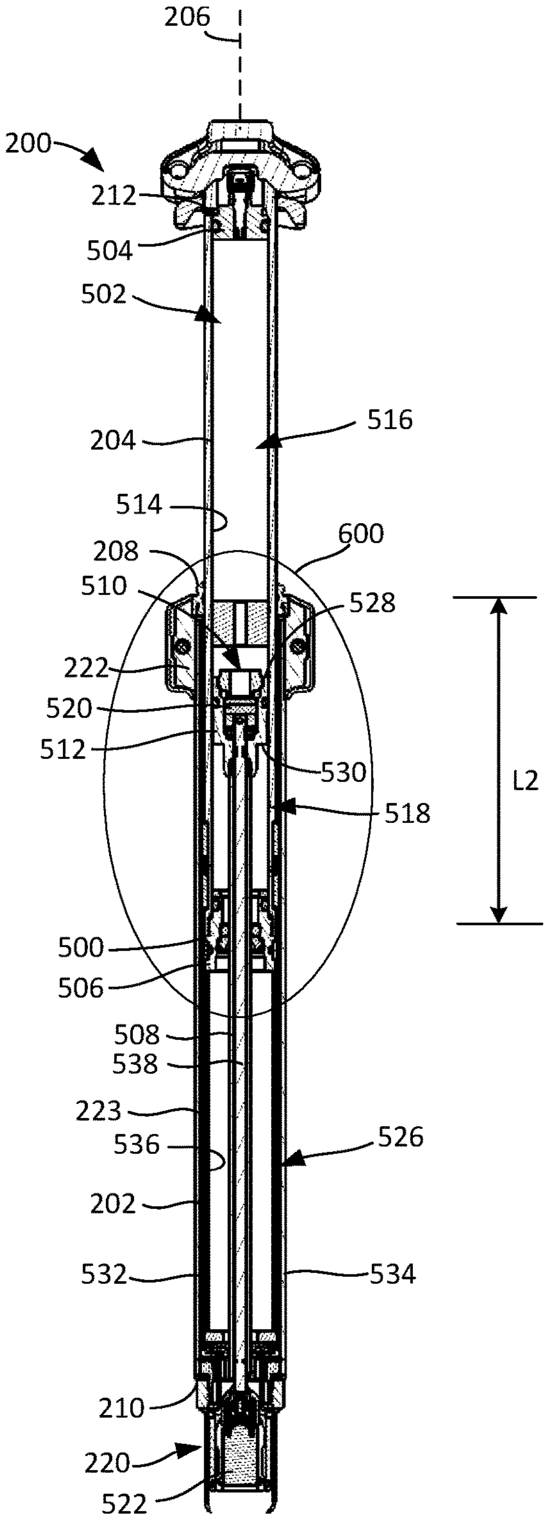
FIG. 6 is a cross-sectional view of the example height adjustable seat post of FIG. 3 in the partially contracted position.

FIG. 5 is a cross-sectional view of the seat post 200 in the fully extended position corresponding to FIG. 2, and FIG. 6 is a cross-sectional view of the seat post 200 in a partially contracted position corresponding to FIG. 3. FIGS. 5 and 6 are described together. As shown in FIGS. 5 and 6, the upper tube 204 has a lower end 500. The lower end 500 is disposed in the lower tube 202. As such, the lower and upper tubes 202, 204 overlap at an area or region of overlap. In FIG. 5, the lower and upper tubes 202, 204 overlap by a length L1, and in FIG. 6, the lower and upper tubes 202, 204 overlap by a length of L2, which is greater than L1. As such, the height or length of the seat post 200 in FIG. 6 is less than the height or length of the seat post 200 in FIG. 5.

As shown in FIGS. 5 and 6, the upper tube 204 defines a chamber 502. The chamber 502 is filled with fluid (e.g., pneumatic gas), as discussed in further detail herein. The seat post 200 includes an upper plug 504 (e.g., a seal) coupled to the upper tube 204 and disposed in the upper tube 204 at or near the upper end 212. The seat post 200 also includes a lower plug 506 (e.g., a seal) coupled to the upper tube 204 and disposed in the upper tube 204 are or near the lower end 500. The upper and lower plugs 504, 506 seal the ends of the upper tube 204 to maintain the fluid in the chamber 502.

In the illustrated example of FIGS. 5 and 6, the seat post 200 includes a shaft 508, which may be referred to as a rod or valve rod housing. The shaft 508 is disposed in the lower tube 202 and coupled to the lower tube 202, such that the shaft 508 is fixed relative to the lower tube 202. The shaft 508 extends upward through the lower tube 202 into the chamber 502 of the upper tube 204. In particular, the shaft 508 extends through the lower plug 506 and into the upper tube 204. The lower plug 506 is slidable up and down along the shaft 508 as the seat post 200 expands or contracts.

In the illustrated example of FIGS. 5 and 6, the seat post 200 includes a piston assembly 510 disposed in the upper tube 204. The piston assembly 510 may also be referred to as a valve assembly or flow control member. The piston assembly 510 is disposed in the chamber 502 of the upper tube 204 and is coupled to the shaft 508. As the seat post 200 expands or contracts, the piston assembly 510 located farther away or closer to, respectively, the upper end 212 of the upper tube 204. The piston assembly 510 includes a piston 512 that is sealed against an inner surface 514 of the upper tube 204. The inner surface 514 of the upper tube 204 is slidable up and down along the piston 512 as the seat post 200 expands or contracts. The piston assembly 510 and, in particular, the piston 512, divides the chamber 502 of the upper tube 204 into a first chamber 516 (between the piston

512 and the upper plug 504) and a second chamber 518 (between the piston 512 and the lower plug 506). The first and second chambers 516, 518 may also be referred to as upper and lower chambers, respectively. The volumes of the first and second chambers 516, 518 change as the upper tube 204 moves up and down relative to the piston assembly 510. The first and second chambers 516, 518 are filled with a fluid. In this example, the seat post 200 is based on a pneumatic platform. The first and second chambers 516, 518 are filled with a pressurized gas, such as nitrogen or air. In other examples the first and second chambers 516, 518 can be filled with another type of compressible gas. The piston assembly 510 controls the flow of gas across the piston 512 and between the first and second chambers 516, 518.

In the illustrated example of FIGS. 5 and 6, the seat post 200 includes a valve 520. In this example, the valve 520 is incorporated into and/or integrated with the piston assembly 510. As such, the valve 520 is disposed in the upper tube 204 and at least partially in a region of overlap (e.g., L1 or L2) between the upper tube 204 and the lower tube 202. In this example, the valve 520 is a rotary valve. However, in other examples, other types of valves can be used. The valve 520 can be operated (e.g., opened or closed) to control the flow of gas across the piston 512 between the first and second chambers 516, 518. In particular, the valve 520 is operable between a closed state in which the fluid (e.g., pressurized gas) is blocked from flowing across the piston 512 between the first and second chambers 516, 518, which maintains the lower and upper tubes 202, 204 in position, and an open state to enable the fluid to flow across the piston 512 between the first and second chambers 516, 518, which enables the upper tube 204 to move relative to the lower tube 202 for adjusting the height of the seat 110.

To operate or control the valve 520, the motor assembly 220 includes a motor 522. In particular, the motor 522 controls the state of the valve 520. However, in other examples, the valve 520 can be operated by a solenoid or other type of actuator. In the illustrated example, the motor assembly 220 (along with the motor 522) is coupled to the lower end 210 of the lower tube 202. In other examples, the motor assembly 220 can be coupled to or integrated into the piston assembly 510 in the upper tube 204 (an example of which is disclosed in connection with FIG. 24).

Figure 7:
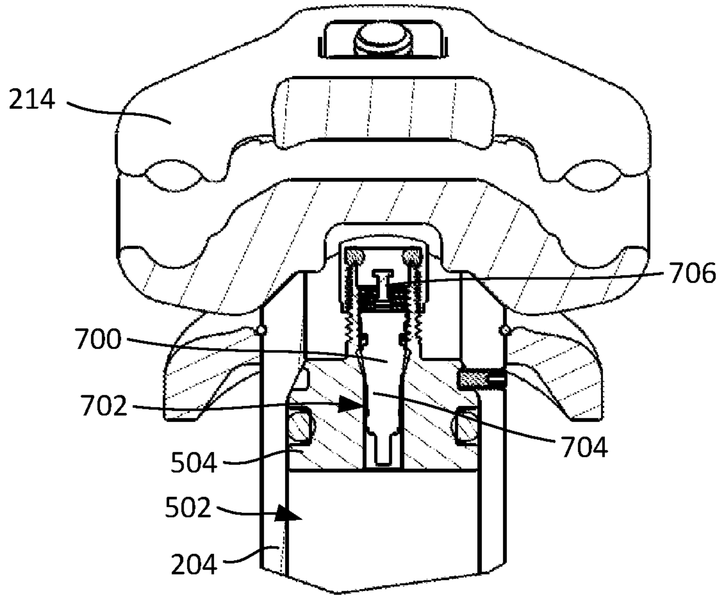
FIG. 7 is an enlarged view of the upper callout of FIG. 5 showing an example valve for adding pneumatic gas to the example height adjustable seat post.

Referring briefly to FIG. 7, FIG. 7 is an enlarged view of the callout 524 of FIG. 5 showing the upper plug 504. The upper plug 504 includes a valve 700, which enables a user to add or remove pneumatic fluid to/from the chamber 502 in the upper tube 204. The valve 700 is disposed in an opening 702 through the upper plug 504. In this example, the valve 700 is implemented as a Schrader valve. However, in other examples, the valve 700 may be implemented as another type of valve, such as a Presta valve. The valve 700 includes a valve body 704 (sometimes referred to as a stem) and a core 706 (e.g., a poppet valve) that controls the flow of fluid through the valve body 704. A user can remove the seat clamp 214 and access the valve 700 to add or remove pneumatic fluid to/from the chamber 502.

Referring back to FIGS. 5 and 6, in this example, the first chamber 516 is a positive pressure chamber and the second chamber 518 is a negative pressure chamber. The first chamber 516 and the second chamber 518 are pressure sealed chambers. The lower tube 202 defines a third chamber 526 between the lower plug 506 and the motor assembly 220. The third chamber 526 is considered a pressure control chamber. The volume of the third chamber 526 changes based on the actuated position. In some examples, the third chamber 526 contains atmospheric air that is vented to the atmosphere. However, in other examples, the third chamber 526 is also a pressure sealed chamber (e.g., containing pressurized air or nitrogen). In such an example, the air in the third chamber 526 may be compressed as the upper tube 204 is moved downward. This compressed air can provide a biasing force to return the seat post 200 to the fully extended position. In other examples, the third chamber 526 can have other mechanisms for compensating for the change in volume, such as a floating piston or a deformable bladder. The first chamber 516, the second chamber 518, and the third chamber 526 may be any number of shapes and/or sizes. For example, the first chamber 516, the second chamber 518, and the third chamber 526 may be cylindrically shaped (e.g., with outer diameters between 27 mm and 35 mm, respectively) and may be sized for a particular maximum post adjustment (e.g., 150 mm).

As shown in FIGS. 5 and 6, the piston 512 has a first side 528 facing the upper plug 504 and a second side 530 opposite the first side 528 and facing the lower plug 506. An axial surface area (as viewed along the axis 206) of the first side 528 of the piston 512 is greater than an axial surface area of the second side 530 of the piston 512. This is because a portion of the axial surface area of the second side 530 is reduced by the cross-sectional area of the shaft 508. When the valve 520 is in the closed state and the seat post 200 is in the fully extended position (FIG. 5), the first chamber 516 acts as a spring and is configured to bias the upper tube 204 towards the fully extended position of the seat post 200. The first side 528 and the second side 530 of the piston 512 are sized and shaped, and the first chamber 516 and the second chamber 518 are respectively pressurized when the seat post 200 is in the fully extended position, such that the gas within the first chamber 516 supports the weight rider. In some examples, the seat 110 sags less than 10 mm as a result of the weight of the rider on the seat 110 when the seat post 200 is in the fully extended position. The seat post 200 operates because the axial surface area of the first side 528 of the piston 512 versus a pneumatic pressure ratio between the first chamber 516 and the second chamber 518 holds up the rider based on the force calculation. This is also dependent on the volume of the second chamber 518 at the fully extended position of the seat post 200. In the illustrated example of FIG. 5, the volume of the first chamber 516 is greater than the volume of the second chamber 518 when the seat post 200 is in the fully extended position. In some examples, the volume of the second chamber 518 may be no more than twenty percent of the volume of the first chamber 516 when the seat post 200 is in the fully extended position. In other examples, the first and second chambers 516, 518 may have a different volume ratio in the fully extended position. For example, the volume of the second chamber 518 may be no more than ten percent, five percent, or three percent of the volume of the first chamber 516 when the seat post 200 is in the fully extended position. This makes the seat post 200 act like a zero negative pressure preloaded pneumatic spring. This is the principal that holds up the rider with a feel the rider experiences as being rigid. At the fully extended position of the seat post 200, the seat 110 may move a small amount, but this movement is typically not perceivable to the rider.

As an example operation, assume the seat post 200 is in the fully extended position shown in FIG. 5 and the rider desires to lower the seat 110 (FIG. 1). The rider presses a seat post actuation button 117 (e.g., on the handlebars 118 FIG. 1), and the control module 222 activates the motor 522 to open the valve 520. When the valve 520 is open, a force can be applied downward on the seat 110 to compress the seat post 200. For example, the rider can sit (or partially sit) on the seat 110 to apply downward pressure with his/her bottom. This downward pressure forces gas from the first chamber 516 to flow through the valve 520 (and across the piston assembly 510) and into the second chamber 518. This enables the upper tube 204 to move downward relative to the upper tube 204, thereby lowering the seat 110. As the upper tube 204 is moved downward, the volume of the first chamber 516 is reduced and the volume of the second chamber 518 is increased. The rider can move (e.g., lower) the seat 110 to any position between the fully extended position and a fully contracted position. FIG. 6 shows the seat post 200 as in an intermediate position between the fully extended position and the fully contracted position.

When the seat 110 is at a desired position, such as the position in FIG. 6, the rider can release the seat post actuation button. The control module 222 activates the motor 522 to close the valve 520. When the valve 520 is closed, gas is prevented from flowing across the piston assembly 510 between the first chamber 516 and the second chamber 518. This limits or prevents further relative movement of the upper tube 204 relative to the lower tube 202. When the valve 520 is closed, the balance of forces in the system is such that the axial pressure force acting on the first side 528 of the piston 512 is approximately equal to the axial pressure force acting on the second side 530 of the piston 512. Therefore, when the rider sits on the seat 110, the seat post 200 can support the weight of the rider. In some examples, when the seat post 200 is in an intermediate position (between the fully extended position and the fully contracted position), the seat 110 may sag a small amount (e.g., 40 mm or less) as a result of the weight of the rider. If the seat post 200 is moved to the fully contracted position, the seat clamp 214 contacts the upper end 208 of the lower tube 202 and/or the lower plug 506 contacts a disc 1208 (shown in FIG. 12) in the lower end 210 of the lower tube 202. This provides a hard stop to prevent further movement. When the seat post 200 is in the fully contracted position, the seat 110 may not sag due to this hard stop. In some examples, when the seat post 200 is in the fully expanded position (FIG. 5), the piston 512 is engaged with a top of the lower plug 506. This forms a limit or stop that prevents the upper tube 204 from moving any further upward relative to the lower tube 202.

When it is desired to raise the seat post 200 back to the fully extended position, the rider presses on the seat post actuation button, and the control module 222 activates the motor 522 to open the valve 520. With no external downward force acting on the seat 110 (FIG. 1), the pressure in the first chamber 516 the upper tube 204 causes the upper tube 204 to move upward relative to the lower tube 202 back to the fully extended position. This is because the axial surface area of the first side 528 of the piston 512 is greater than the axial surface area on the second side 530. As such, the force of the pressure in the first chamber 516 acting on the first side 528 of the piston 512 is larger than the force from the pressure in the second chamber 518 acting on the second side 530 of the piston 512. As a result, the upper tube 204 is forced upward to the fully extended position. As the upper tube 204 moves upward, fluid flows across the valve 520 from the second chamber 518 to the first chamber 516. Therefore, the axial pressure force imbalance biases the seat post 200 towards the fully extended position. This enables the seat post 200 to automatically expand back to the fully extended position. When the seat post 200 is fully extended, the rider can release the seat post actuation button, which activates the motor 522 to close the valve and thereby maintain the seat post 200 in the fully extended position. Therefore, the pressurized gas in the first chamber 516 biases the upper and lower tubes 204, 202 away from each other, and the pressurized gas in the second chamber 518 biases the upper and lower tubes 204, 202 toward each other.

As disclosed above, in some examples, the third chamber 526 is vented to the atmosphere. As such, the third chamber 526 provides minimal, if any, biasing force on the upper tube 204. However, in other examples, the third chamber 526 can be sealed and pressurized with a positive pressure. In such an example, when the upper tube 204 is moved downward, the volume of the third chamber 526 is reduced, which increases the pressure in the third chamber 526. This pressure acts upward on the lower plug 506 to help bias the upper tube 204 to the fully extended position.

As disclosed above, the control module 222 includes processor circuitry to control and operate the motor 522. In the illustrated example of FIGS. 5 and 6, the control module 222 is located on the outer surface 223 of the lower tube 202, at or near the upper end 208 of the lower tube 202, while the motor 522 is coupled to the lower end 210 of the lower tube 202. The seat post 200 can include one or more wires and/or electrical connections to form an electrical path between the control module 222 and the motor 522. This enables power and/or command signals to be transferred between the control module 222 and the motor 522. For example, as shown in FIGS. 5 and 6, the seat post 200 includes first and second wires 532, 534 disposed in the lower tube 202. In some examples, the first and second wires 532, 534 are positive and negative wires. The first and second wires 532, 534 are electrically coupled to the control module 222. The first and second wires 532, 534 extend through the lower tube 202 to the motor assembly 220. In other words, in this example, the first and second wires 532, 534 extend between the upper end 208 and the lower end 210 of the lower tube 202. In the illustrated example, the first and second wires 532, 534 are disposed along an inner surface 536 of the lower tube 202. In some examples, the first and second wires 532, 534 are disposed with respective channels formed along the inner surface 536 of the lower tube 202. In some examples the channels are formed of the same material (e.g., aluminum) as the lower tube 202. In other examples, the channels may be formed through the wall of the lower tube 202. In the illustrated example, the first and second wires 532, 534 are disposed on opposite sides of the lower tube 202. This may be beneficial to provide separation between the positive and negative wires. However, in other examples, the first and second wires 532, 534 can be disposed adjacent each other. In some examples, each of the wires 532, 534 has an insulated sheath. In other examples, the wires 532, 534 may be sheathed together.

As shown in FIGS. 5 and 6, the seat post 200 includes a valve rod 538 that is disposed in the shaft 508. The valve rod 538 is aligned along the axis 206 of the seat post 200. The valve rod 538 extends through the shaft 508 and between the valve 520 and the motor assembly 220. The valve rod 538 is rotatable in the shaft 508. The ends of the valve rod 538 are coupled to the valve 520 and the motor assembly 220. As such, the motor 522 can be activated to rotate the valve rod 538 to change the state of the valve 520. For example, the motor 522 can be activated to rotate the valve rod 538 in a first direction to open the valve 520 and a second direction (the opposite direction) to close the valve 520. In some examples, the motor 522 is a brushed, coreless direct-current (DC) motor. In other examples, other types of motors can be implemented. The motor 522 is powered or activated by the control module 222. As disclosed above, the wires 532, 534 are routed through the lower tube 202 between the control module 222 and the lower end 210 of the lower tube 202 to electrically connect the control module 222 to the motor 522.

Figure 8:
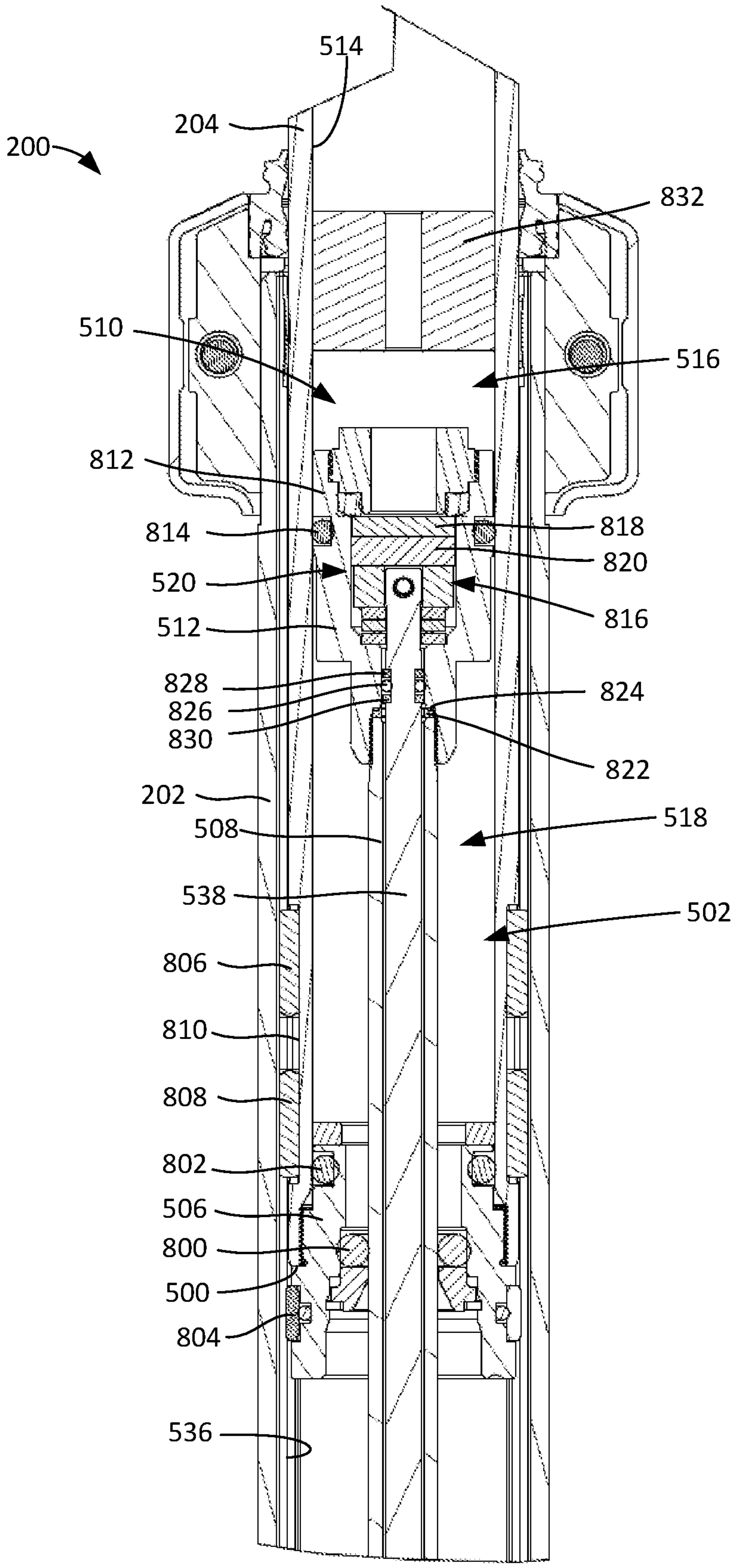
FIG. 8 is an enlarged view of the callout of FIG. 6 showing a cross-sectional view of an example piston assembly with an example rotary valve implemented in the example height adjustable seat post.

FIG. 8 is an enlarged view of the callout 600 of FIG. 6 showing the example piston assembly 510 in the upper tube 204. As shown in FIG. 8, the lower plug 506 is threadably coupled to the lower end 500 of the upper tube 204, which seals the lower end 500 of the upper tube 204. The seat post 200 includes a shaft seal 800 between the lower plug 506 and the shaft 508 to prevent leakage through the lower plug 506. The shaft seal 800 also enables the lower plug 506 to slide smoothly up and down along the shaft 508 as the seat post 200 expands and contracts. The seat post 200 includes a first outer seal 802 between the lower plug 506 and the inner surface 514 of the upper tube 204, and a second outer seal 804 between the lower plug 506 and the inner surface 536 of the lower tube 202. The seat post 200 also includes first and second seals 806, 808 between an outer surface 810 of the upper tube 204 and the inner surface 536 of the lower tube 202. In other examples, the seat post 200 can include more or fewer seals and/or the seals can be arranged in other configurations.

In the illustrated example of FIG. 8, the piston assembly 510 includes the piston 512 (which may also be referred to as a valve body). The piston 512 is coupled to the shaft 508. In particular, in this example, the piston 512 is threadably coupled to the shaft 508, but in other examples can be coupled to the shaft 508 via other techniques (e.g., via one or more threaded fasteners). The piston 512 has a head portion 812 that is sealed against the inner surface 514 of the upper tube 204. In particular, in this example, the piston assembly 510 includes a seal 814 (which may be referred to as a chamber seal) around the head portion 812 to seal against the inner surface 514 of the upper tube 204. As such, the piston 512 divides the chamber 502 of the upper tube 204 into the first chamber 516 (formed above the head portion 812) and the second chamber 518 (formed below the head portion 812). In the illustrated example, the piston 512 defines a bore 816. The bore 816 forms a portion of a passageway across the head portion 812 that fluidly connects the first chamber 516 and the second chamber 518, as disclosed in further detail herein.

In the illustrated example, the valve 520 is disposed in and/or formed at least partially by the piston 512. The valve 520 is operable between a closed state to block fluid flow across the piston 512 and an open state to allow fluid flow across the piston 512. In the illustrated example, the valve 520 includes a first member or disc 818, referred to herein as a fixed disc 818, and a second member or disc 820, referred to herein as a rotatable disc 820, that is engaged with the fixed disc 818. Each of the discs 818, 820 has two opposing faces and a peripheral edge. The fixed disc 818 is maintained in a fixed position in the piston 512 (i.e., the fixed disc 818 does not rotate relative to the piston 512). The rotatable disc 820 is rotatable relative to the piston 512 and the fixed disc 818. The fixed disc 818 has one or more openings or channels, which, when opened, enable fluid flow across the piston 512 between the first and second chambers 516, 518, as disclosed in further detail herein. The rotatable disc 820 can be rotated to open or close the channels in the fixed disc 818, thereby opening or closing the valve 520. The valve rod 538 extends into the bore 816 of the piston 512 and is coupled to the rotatable disc 820. The valve rod 538 can be rotated by the motor 522, which rotates the rotatable disc 820 to open or close the valve 520.

In the illustrated example, the piston assembly 510 includes a seal 822 (e.g., a crush washer) between the shaft 508 and a shoulder 824 in the piston 512. The seal 822 prevents or limits leakage of the fluid between the second chamber 518 and the bore 816. The piston assembly 510 also includes a valve rod seal 826 between the valve rod 538 and an inner surface of the piston 512. The valve rod seal 826 is held in place between first and second backup rings 828, 830. The inside of the shaft 508 may be exposed to the atmosphere at the bottom end. Therefore, the valve rod seal 826 prevents or limits leakage of fluid between the shaft 508 and the upper section of the bore 816. In some examples, the valve rod seal 826 also creates a smooth surface for the valve rod 58 to rotate relative to the piston 512.

In the illustrated example, the seat post 200 includes a travel spacer 832 in the first chamber 516 in the upper tube 204. The travel spacer 832 is slidable up and down in the upper tube 204. The piston assembly 510 may engage the travel spacer 832 during a compression movement. In some examples, the travel spacer 832 is constructed of a compliant material (e.g., rubber). The travel spacer 832 takes up excess volume in the first chamber 516 (the positive chamber) for different travel heights to maintain the desired air spring rate and range of stroke. Different sized travel spacers can be used depending on the desired range of stroke. For example, a taller traveler spacer can be used for reduced stroke length, whereas a shorter travel spacer can be used for increased stroke length.

Figure 9:
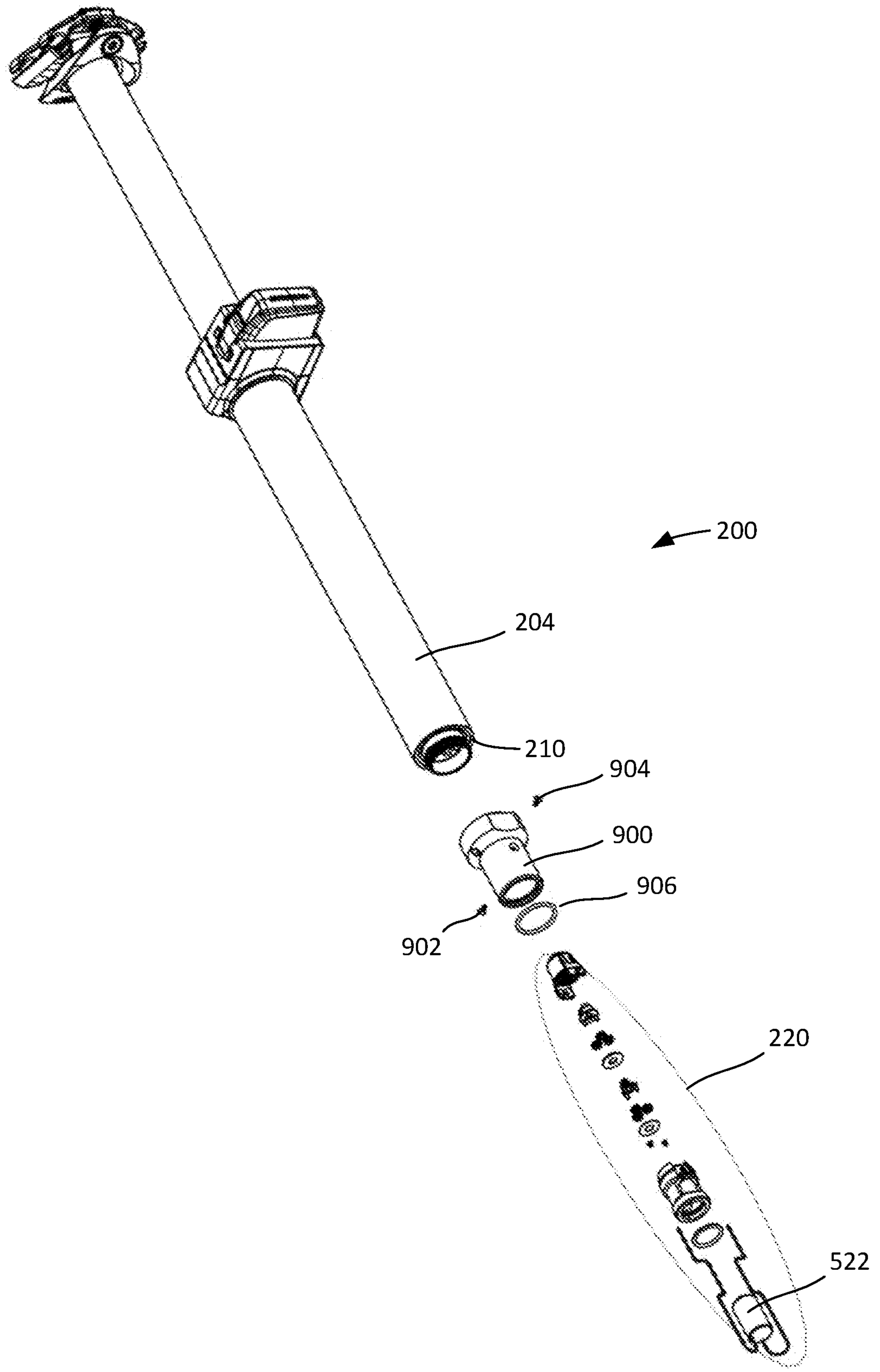
FIG. 9 is an exploded view of an example motor assembly and example motor assembly housing adjacent a lower end of the example height adjustable seat post of FIG. 2.

FIG. 9 is an exploded view of the motor assembly 220 and an example motor assembly housing 900 adjacent the lower end 210 of the lower tube 204. When the seat post 200 is assembled, the motor assembly housing 900 is coupled (e.g., threadably coupled) to the lower end 210 of the lower tube 202 and the motor assembly 220 is disposed at least partially in the motor assembly housing 900. In some examples, first and second housing screws 902, 904 are used to couple the motor assembly 220 in the motor assembly housing 900. Also shown in FIG. 9 is a seal 906 (e.g., an O-ring) that can be disposed between the motor assembly 220 and the motor assembly housing 900 to help dampen vibrations from the motor 522.

Figures 10, 11:
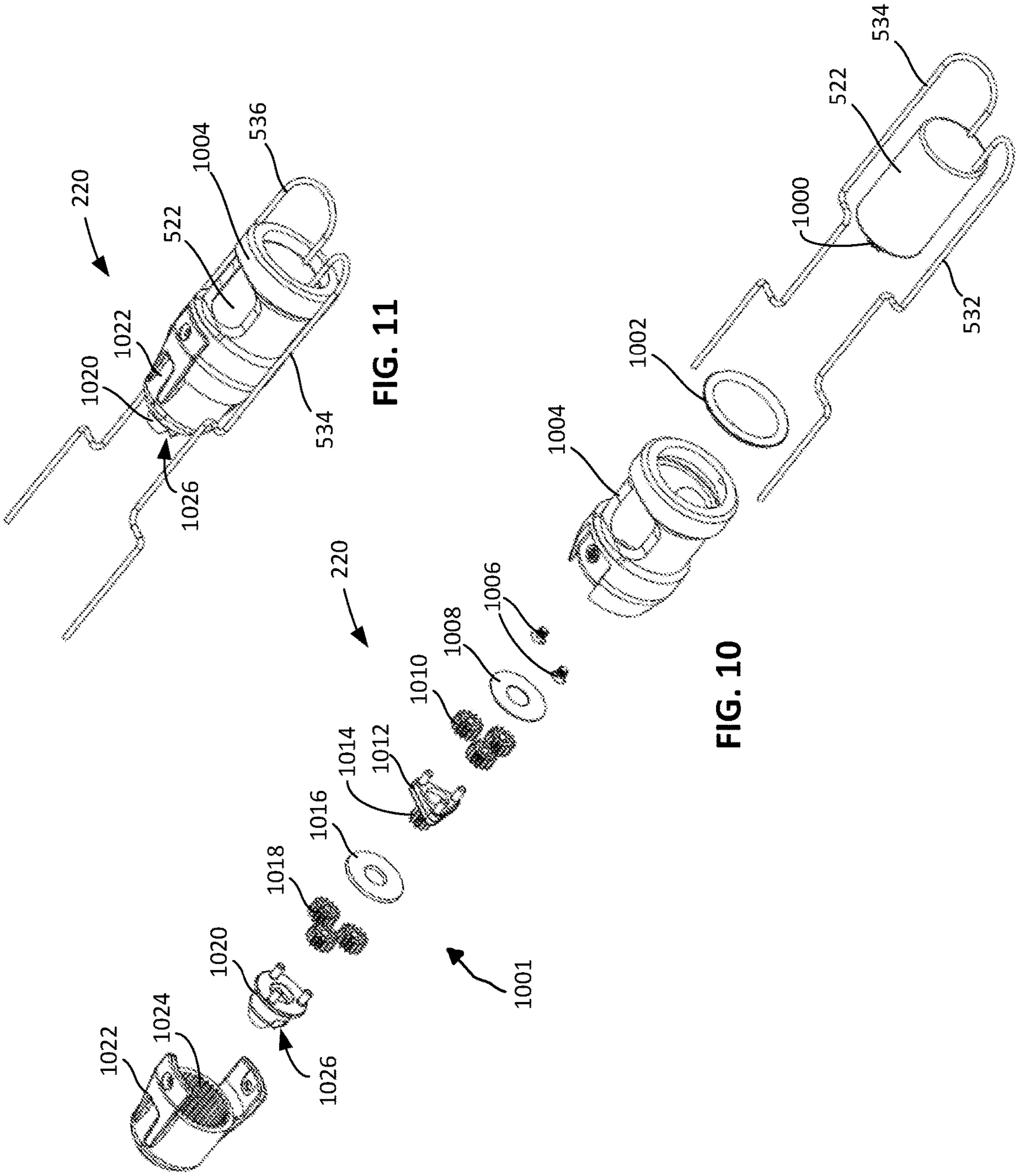
FIG. 10 is an exploded view of the example motor assembly of FIG. 9.
FIG. 11 is an assembled view of the example motor assembly of FIG. 10.

FIG. 10 is an exploded view of the example motor assembly 220. The motor assembly 220 includes a gear reduction system or transmission 1001 to reduce the rotational speed between the motor 522 and an output of the motor assembly 220 that is connected to the valve rod 538 (FIG. 5). In this example, the gear reduction system is a two-stage planetary gear system. This two-stage planetary gear system creates a relatively high gear ratio between the motor 522 and the output of the motor assembly 220. In the illustrated example, the motor assembly 220 includes the motor 522, a first sun gear 1000 coupled to an output (e.g., a drive shaft) of the motor 522, a motor seal 1002 (e.g., an O-ring), a motor housing 1004, motor screws 1006, a first washer 1008, a first set of planetary gears 1010, a first carrier 1012 with a second sun gear 1014, a second washer 1016, a second set of planetary gears 1018, a second carrier 1020, and a cap 1022 with an internal ring gear 1024. A portion of the first and second wires 532, 534 are also shown in FIG. 10. The first and second wires 532, 534 are electrically connected to the motor 522.

FIG. 11 is an assembled view of the motor assembly 220. As shown in FIG. 11, the motor housing 1004 and the cap 1022 are coupled (e.g., via a snap fit) and form an overall housing structure. The motor 522 and the other parts of the motor assembly 220 are disposed in the housing structure formed by the motor housing 1004 and the cap 1022. The first and second wires 532, 534 extend along the outside of the motor housing 1004 and then curve around the end of the motor housing 1004 and are electrically connected to the motor 522. The second carrier 1020 extends from the cap 1022. As shown in FIGS. 10 and 11, the second carrier 1020 has a notch or slot 1026. When the motor assembly 220 is installed on the seat post 200 (FIG. 2), a tab on the valve rod 538 (FIG. 5) extends into the slot 1026, which rotationally couples the second carrier 1020 and the valve rod 538.

As an example operation, when the motor 522 is activated, the motor 522 rotates the first sun gear 1000. The first sun gear 1000 rotates the first set of planetary gears 1010, which orbit around the first sun gear 1000 via interaction with the ring gear 1024. The first set of planetary gears 1010 rotate the first carrier 1012. The second sun gear 1014 (which is part of the first carrier 1012) rotates the second set of planetary gears 1018, which orbit around the second sun gear 1014 via interaction with the ring gear 1024. The second set of planetary gears 1018 rotate the second carrier 1020, which then rotates the valve rod 538 (FIG. 5). The motor assembly 220 utilizes this two-stage planetary gear system to create a relatively high gear ratio between the motor 522 and the second carrier 1020 (the output of the motor assembly 220). For example, the first planetary gear stage may produce a gear reduction ratio of 5:1 and the second planetary gear stage may also produce a gear reduction ratio of 5:1. As such, the two-stage planetary gear system produces a gear reduction ratio of 25:1 (but in other examples can be higher or lower). This provides a large speed reduction between the motor 522 and the second carrier 1020. This increases torque output to the second carrier 1020 while still enabling the motor 522 to operate at a relatively high speed, which is typically more efficient and stable. In other examples, the motor assembly 220 can utilize a single stage planetary gear system or another type of gear reduction system (e.g., a two-gear system). In still other examples, the motor assembly 220 may not utilize any gear reduction system. Instead, the output of the motor 522 can be coupled directly or indirectly to the valve rod 538 without a gear reduction system.

Figure 12:
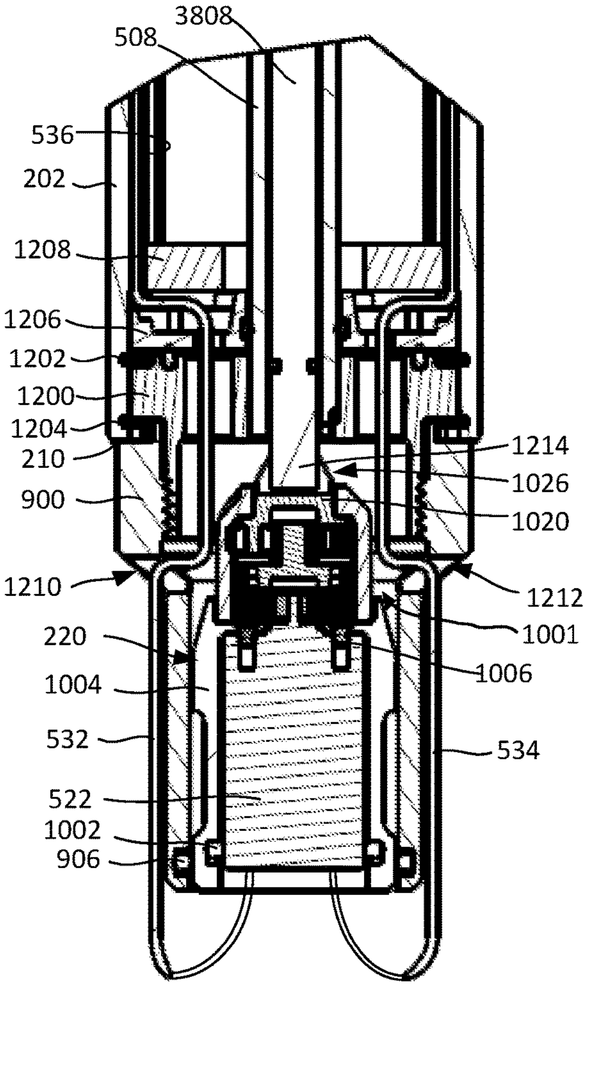
FIG. 12 is an enlarged view of the lower callout of FIG. 5 showing a cross-sectional view of an example motor assembly on a lower end of the example height adjustable seat post.
Figure 13:
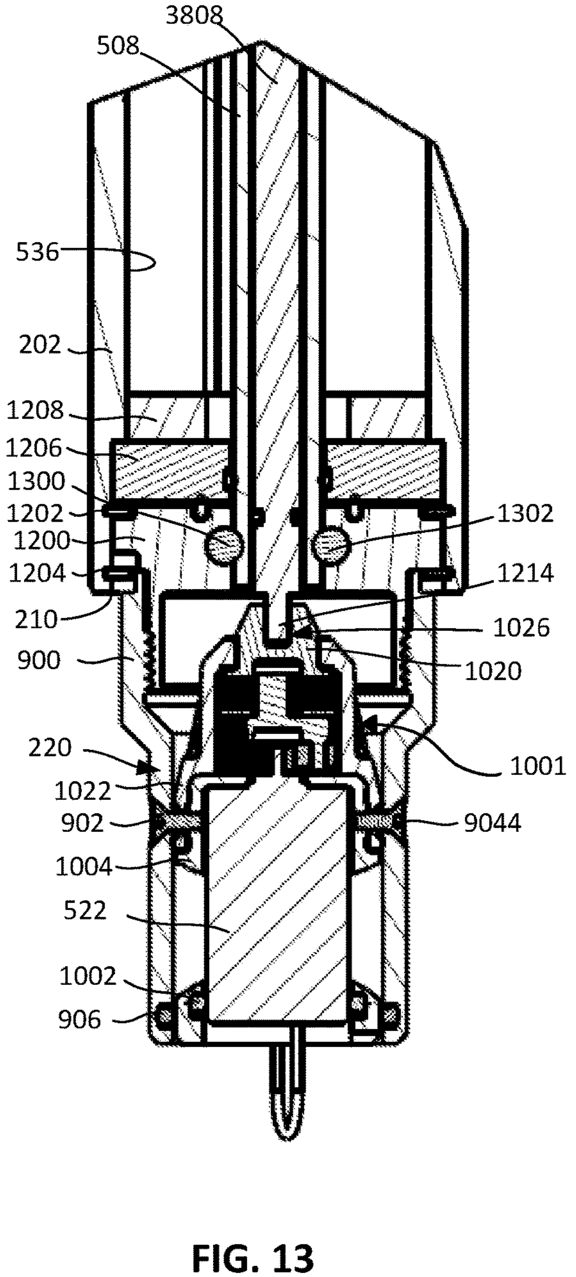
FIG. 13 is a cross-sectional view of the example motor assembly of FIG. 12 taken along a plane that is perpendicular to the cross-sectional view of FIG. 12.

FIG. 12 is an enlarged view of the callout 540 of FIG. 5 showing a cross-sectional view of the motor assembly 220 installed on the lower tube 202. FIG. 13 is a cross-sectional view of the motor assembly 220 installed on the lower tube 202 and taken along a plane that is perpendicular to the cross-sectional view in FIG. 12. As shown in FIGS. 12 and 13, the seat post 200 includes a body 1200 that is disposed partially in the lower tube 202 and extends outward from the lower end 210 of the lower tube 202. The seat post 200 includes retainer rings 1202, 1204 disposed in respective notches formed on the inner surface 536 of the lower tube 202 to secure the body 1200 in the lower tube 202. The shaft 508 extends at least partially into the body 1200. As shown in FIG. 13, the seat post 200 includes the first and second threaded cross-pins 1300, 1302 that are screwed into the respective threaded openings in the body 1200 and extend through the grooves formed in the side of the shaft 508. This prevents the shaft 508 from moving linearly and/or rotating relative to the body 1200. As such, the body 1200 fixedly holds the shaft 508 in the lower tube 202 and thereby couples the shaft 508 to the lower tube 202. In the illustrated example, the seat post 200 includes a plate 1206 and a disc 1208 in the lower tube 202 above the body 1200. The wires 532, 534 extend through openings or notches in the disc 1208, the plate 1206, and the body 1200.

In the illustrated example, the motor assembly housing 900 is threadably coupled to the body 1200 and engaged with the lower end 210 of the lower tube 202. As shown in FIG. 12, the motor assembly housing 900 has openings 1210, 1212. The first and second wires 532, 534 extend through the openings 1210, 1212, extend along an outside of the motor assembly housing 900, wrap around a bottom of the motor assembly housing 900, and extend into the motor assembly 220 to be connected to the motor 522. Therefore, in this example, a portion of the first and second wires 532, 534 are exposed outside of the motor assembly housing 900. However, when the seat post 200 is coupled to the bicycle 100 (FIG. 1), the motor assembly housing 900 is disposed inside of the seat tube 114 (FIG. 1) and, thus, the first and second wires 532, 534 are protected by the frame 102 (FIG. 1) of the bicycle 100. In other examples, the wires 532, 534 can be routed differently such that they are completely shrouded in the motor assembly housing 900. In some examples, the wires 532, 534 are directly connected to the motor 522. In other examples, the wires 532, 534 can be connected to the motor 522 through a quick disconnect between the lower tube 202 and the motor assembly housing 900.

As illustrated in FIGS. 12 and 13, the motor assembly 220 is disposed in the motor assembly housing 900. The seal 906 is disposed between the motor assembly housing 900 and the motor housing 1004 and helps to reduce or dampen vibrations from the motor 522. As shown in FIG. 13, the housing screws 902, 904 extend through the motor assembly housing 900 and into the motor housing 1004 and the cap 1022, which couples the motor assembly 220 to the motor assembly housing 900.

As shown in FIGS. 12 and 13, the motor 522 is disposed in the motor housing 1004. The motor screws 1006 (one of which is referenced in FIG. 12) are used to couple the motor 522 in the motor housing 1004. Further, the motor seal 1002 is disposed between the motor 522 and the motor housing 1004 to help hold the motor 522 in the motor housing 1004.

As shown in FIGS. 12 and 13, the gear reduction system 1001 (i.e., the two-stage planetary gear system) is between the motor 522 and the valve rod 538. The valve rod 538 has a tab 1214 extending into the slot 1026 in the second carrier 1020. As such, the valve rod 538 and the second carrier 1020 are keyed together. Therefore, when the motor 522 is activated, the motor 522 rotates the second carrier 1020 via the two-stage planetary gear system, and the second carrier 1020 rotates the valve rod 538. The motor 522 is a bi-directional motor that can be activated to rotate the valve rod 538 in either direction. In this example, the tab 1214 has a rectangular cross-sectional shape. In other examples, the tab 1214 and the slot 1026 can be shaped differently.

Figure 14:
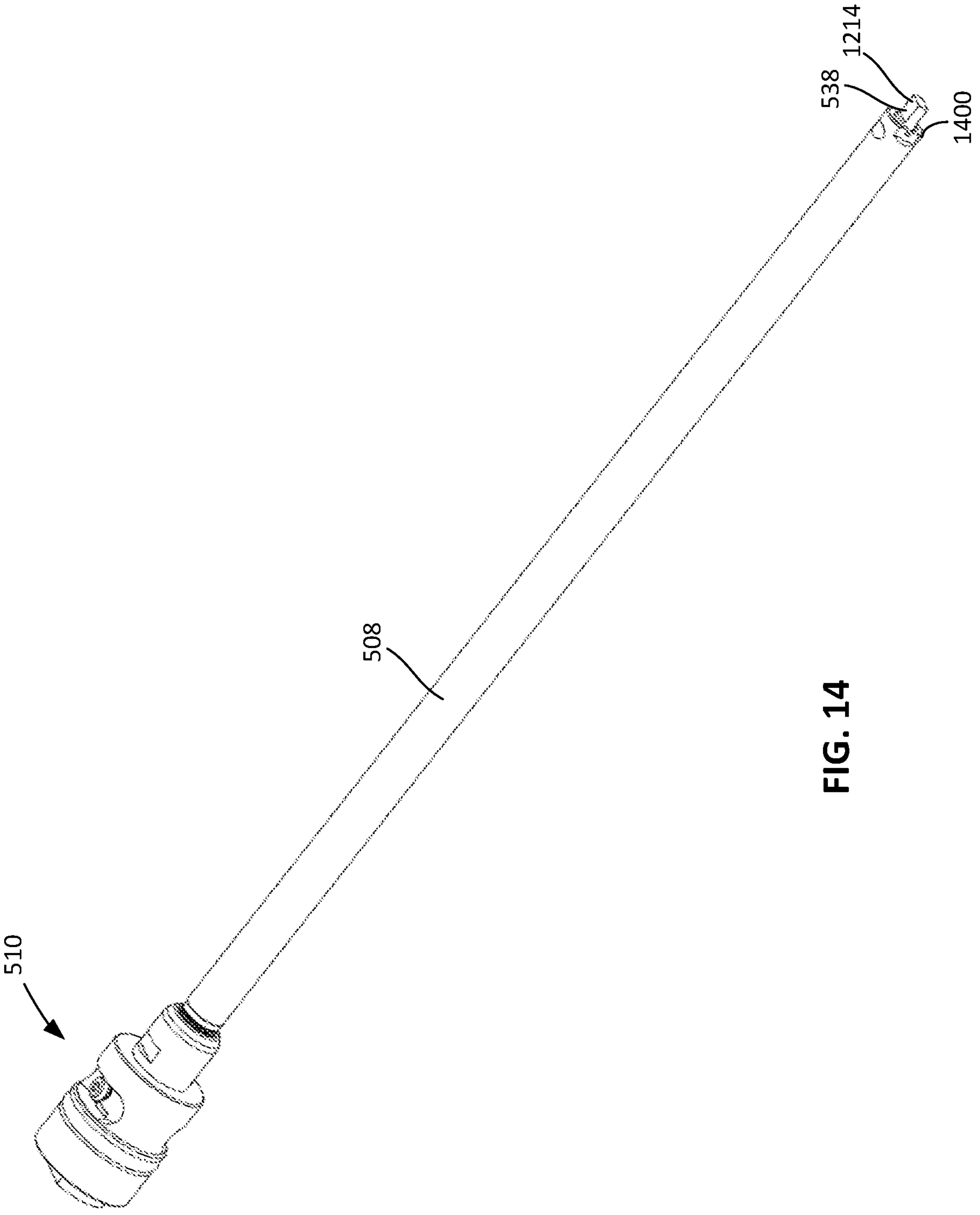
FIG. 14 is a perspective view of the example piston assembly coupled to an example shaft of the example height adjustable seat post of FIG. 2.

FIG. 14 is a perspective view of the shaft 508 and the piston assembly 510. The piston assembly 510 is coupled to the shaft 508 at or near a top end of the shaft 508. The valve rod 538 is disposed in and extends through the shaft 508. As shown in FIG. 14, the tab 1214 on the valve rod 538 extends outward from a bottom end 1400 of the shaft 508.

Figure 15:
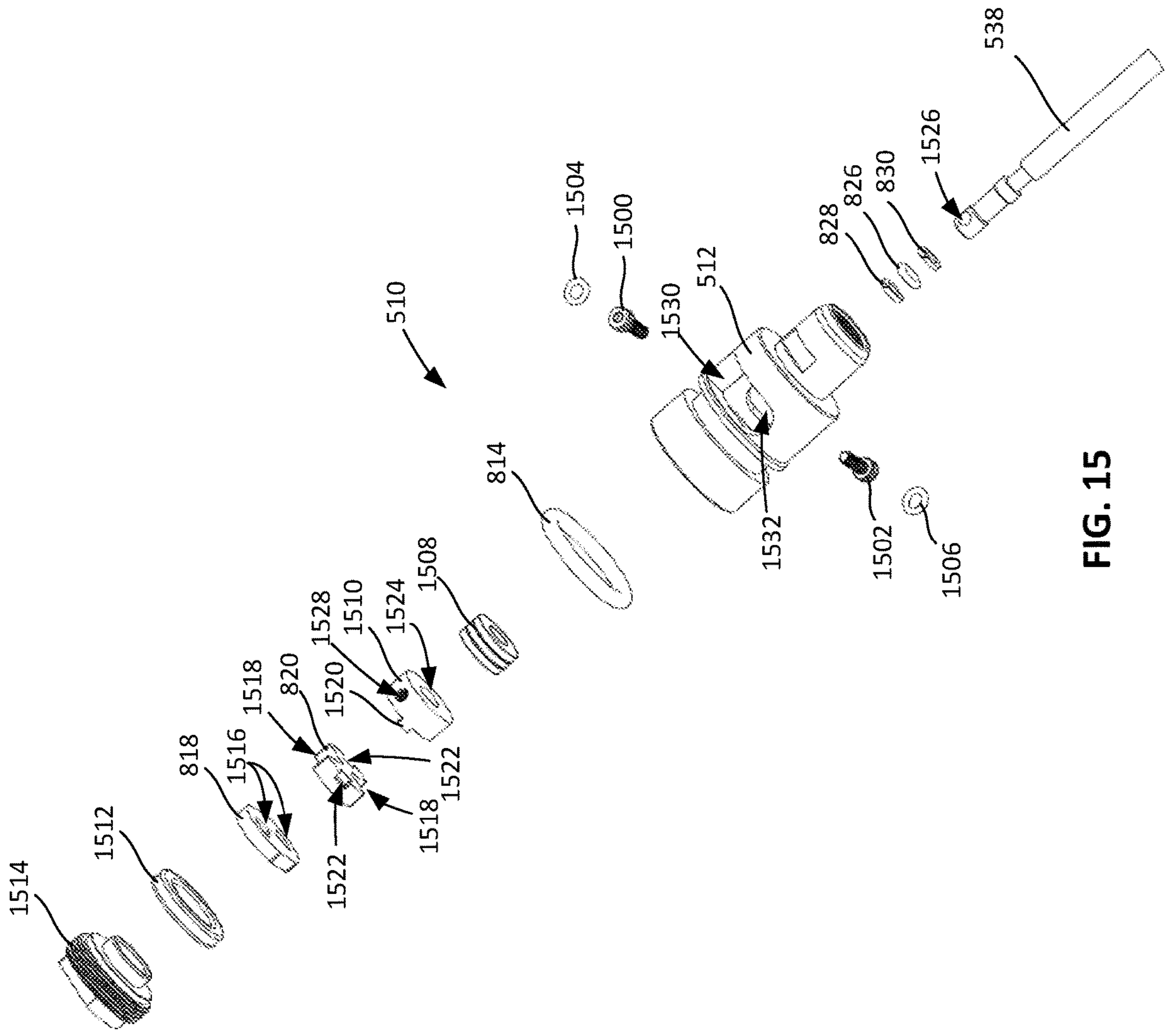
FIG. 15 is an exploded view of the example piston assembly and the example shaft of FIG. 14.

FIG. 15 is an exploded view of the piston assembly 510 and the valve rod 538. In the illustrated example, the piston assembly 510 includes the valve rod seal 826 and the backup rings 828, 830, the piston 512, a first stop bolt 1500, a second stop bolt 1502, a first stop O-ring 1504 for the first stop bolt 1500, a second stop O-ring 1506 for the second stop bolt 1502, the seal 814, a thrust bearing 1508, a disc key 1510, the rotatable disc 820, the fixed disc 818, a disc seal 1512, and a retaining member, in this embodiment a disc cap 1514.

When the piston assembly 510 is assembled, the fixed disc 818 and the rotatable disc 820 are stacked together and disposed in the piston 512. In the illustrated example, the fixed disc 818 has two fixed disc fluid flow passageways, in this embodiment openings 1516 (e.g., channels, flow paths) and the rotatable disc 820 has two rotatable disc fluid flow passageways, in this embodiment notches 1518. The openings 1516 extend through the fixed disc 818 in an axial direction. The rotatable disc 820 is rotatable between an open position and a closed position relative to the fixed disc 818. When the rotatable disc 820 is the open position, the notches 1518 are at least partially overlapping or aligned with the openings 1516 in the axial direction, which enables fluid flow across the fixed disc 818 and the rotatable disc 820 and between the first and second chambers 516, 518 (FIG. 5). When the rotatable disc 820 is in the closed position, the notches 1518 do not overlap with the openings 1516 in the axial direction and, thus, the openings 1516 are blocked by the rotatable disc 820. This prevents or blocks fluid flow across the fixed disc 818 and the rotatable disc 820 and between the first and second chambers 516, 518 (FIG. 5).

In this example, the valve rod 538 is coupled to the rotatable disc 820 via the disc key 1510. The disc key 1510 is mated with the rotatable disc 820 via a keying feature such that rotation of the valve rod 538 causes rotation of the rotatable disc 820. For example, the disc key 1510 has protrusions 1520 (one of which is shown in FIG. 15), and the rotatable disc 820 has corresponding recesses, in this embodiment notches 1522, to receive the protrusions 1520. This rotationally fixes the disc key 4610 and the rotatable disc 820. As such, rotation of the disc key 1510 causes rotation of the rotatable disc 820. When the piston assembly 510 is assembled, the valve rod 538 extends into the piston 512 and is coupled to the disc key 1510. For example, the disc key 1510 has a central opening 1524 to receive the valve rod 538. The valve rod 538 has an opening 1526 (e.g., a through-hole). The disc key 1510 has a first threaded opening 1528 and a second threaded opening (on the opposite side of the disc key 1510). When the end of the valve rod 538 is inserted into the central opening 1524 in the disc key 1510, the first and second stop bolts 1500, 1502 are screwed into their respective openings in the disc key 1510 and extend into the opening 1524 in the valve rod 538. As such, the valve rod 538 is coupled to the disc key 1510 by the first and second stop bolts 1500, 1502. Therefore, rotation of the valve rod 538 causes rotation of the disc key 1510, which causes rotation of the rotatable disc 820. However, in other examples, the disc key 1510 may not be included and the valve rod 538 can be coupled directly to the rotatable disc 820.

In the illustrated example of FIG. 15, the piston 512 has a first radial opening 1530 (e.g., a slot, a window) and a second radial opening 1532 on the opposite side of the piston 512. The first and second radial openings 1530, 1532 form a portion of the flow path across the piston 512 and between the first and second chambers 516, 518 (FIG. 5), disclosed in further detail herein. Further, when the piston assembly 510 is assembled, the first and second stop O-rings 1504, 1506 and at least a portion of the first and second top bolts 1500, 1502 are disposed in the corresponding first and second radial openings 1530, 1532. This provides a limit or stop for how far the valve rod 538 can be rotated in either direction. As such, this provides a rotational limit for the rotatable disc 820. While in this example the piston 512 has two radial openings 1530, 1532, in other examples the piston 512 may have only one radial opening or may have more than two radial openings.

Figure 18:
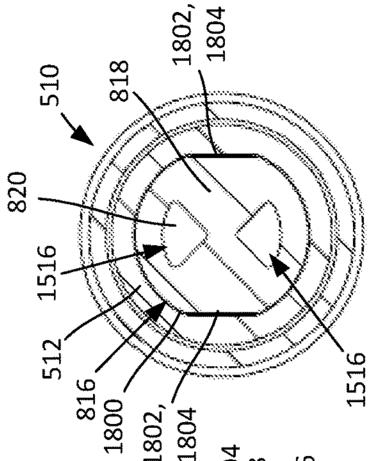
FIG. 18 is a cross-sectional view of the example piston assembly taken along lines B-B of FIG. 16 showing example openings in an example fixed disc.
Figure 19:
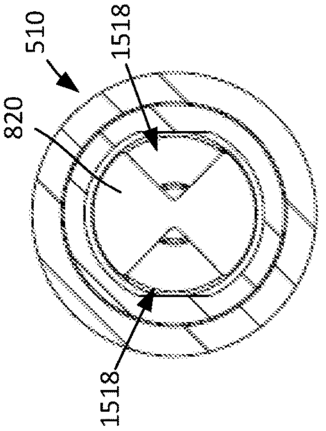
FIG. 19 is a cross-sectional view of the example piston assembly taken along lines C-C of FIG. 16 showing an example rotatable disc in a closed position.
Figure 17:
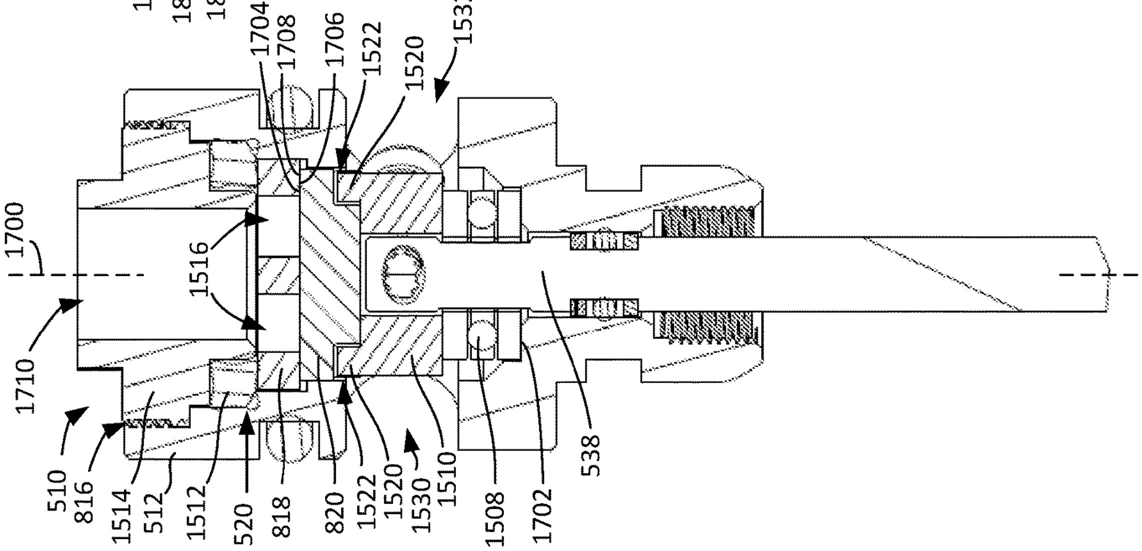
FIG. 17 is a cross-sectional view of the example piston assembly and the example shaft taken along lines A-A of FIG. 16 showing the example rotary valve in the closed state.
Figure 16:
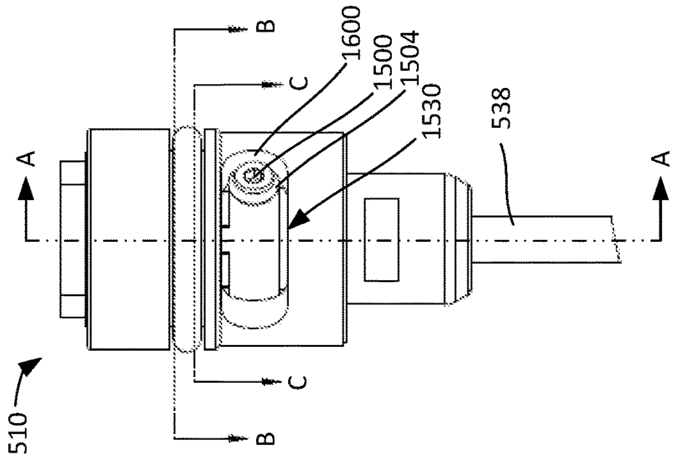
FIG. 16 is a side view of the example piston assembly and the example shaft of FIGS. 14 and 15 in which the example rotary valve is in a closed state.

FIGS. 16-19 show different views of the piston assembly 510 in which the valve 520 is in the closed state. FIG. 16 is a side view of the piston assembly 510 coupled to the valve rod 538. FIG. 17 is a cross-sectional view of the piston assembly 510 and the valve rod 538 taken along line A-A of FIG. 16. FIG. 18 is a cross-sectional view taken along line B-B of FIG. 16 showing an axial view (e.g., a top view) of the fixed disc 818. FIG. 19 is a cross-sectional view taken along line C-C of FIG. 16 showing an axial view (e.g., a top view) of the rotatable disc 820 in the closed position.

As shown in FIG. 17, the disc seal 1512, the fixed disc 818, the rotatable disc 820, the disc key 1510, and the thrust bearing 1508 are stacked together and disposed in the bore 816 defined in the piston 512. The disc cap 1514 is coupled (e.g., threadably coupled) to the piston 512. The disc key 1510 is coupled to the valve rod 538. The protrusions 1520 on the disc key 1510 extend into the notches 1522 in the rotatable disc 820. As such, the disc key 1510 and the rotatable disc 820 are rotationally constrained. The rotatable disc 820 has two opposite sides or faces and a peripheral edge. In some examples, the rotatable disc 820 is symmetrical and has a constant thickness. In other examples, the rotatable disc 820 can include other key features (e.g., protrusions) and/or can be non-symmetrical and/or of varying thickness.

The piston assembly 510 has a central axis 1700, which is aligned with or coincident with the axis 206 (FIG. 2). In some examples, the fixed disc 818 is not axially fixed to the piston 512. However, as shown in FIG. 17, the disc cap 1514 is screwed onto the top of the piston 512. This axially constrains the disc seal 1512, the fixed disc 818, the rotatable disc 820, the disc key 1510, and the thrust bearing 1508 in the bore 816 between the disc cap 1514 and a shoulder 1702 in the piston 512. The tightening of the disc cap 1514 applies an axial pressure or force on the fixed disc 818 and the rotatable disc 820, referred to as a disc preload. This disc preload creates sealing contact between the fixed disc 818 and the rotatable disc 820 to fluidly separate the first and second chambers 516, 518 (FIG. 5). In particular, the fixed disc 818 and the rotatable disc 820 form a face seal 1704 between a first face 1706 (e.g., a bottom surface) of the fixed disc 818 and a second face 1708 (e.g., a top surface) of the rotatable disc 820. The fixed disc 818 and the rotatable disc 820 are oriented such that the first and second faces 1706, 1708 are facing or perpendicular to the axial direction. In other examples, the first and second faces 1706, 1709 may be facing each other but are not perpendicular to the axial direction. The disc preload ensures a tight seal along the face seal 1704 to prevent fluid leakage between the fixed disc 818 and the rotatable disc 820. In some examples, the fixed disc 818 and the rotatable disc 820 are constructed of a relatively hard material. For example, the fixed disc 818 and the rotatable disc 820 can be constructed of ceramic, such as aluminum oxide (also referred to as alumina). Using such a material with high surface hardness and low surface coefficient of friction creates a relatively tight seal along the face seal 1704. In other examples, the fixed disc 818 and the rotatable disc 820 can be constructed of other types of ceramics, metals, and/or hard polymers. The fixed disc 818 and the rotatable disc 820 can be constructed of the same material or different materials. In some examples, this type of face seal is also advantageous because it is self-cleaning. In particular, as the rotatable disc 820 is rotated open and closed, the rotatable disc 820 wipes or scrapes away debris (e.g., dirt, grime, etc.) from first and second faces 1706, 1708. In some examples, oil and/or grease is applied along one or more of the contact surfaces (e.g., the face seal 1704, the surfaces between the fixed disc 818 and the disc seal

1512, the surfaces between the fixed disc 818 and the piston 512, etc.) to reduce friction and improve sealing function.

In some examples, the disc seal 1512 is constructed of a compliant polymer. As such, the disc seal 1512 provides a compressive spring force on the fixed disc 820 in the preload direction (the axial direction). In some examples, the disc seal 1512 is constructed of a buna-nitrile seal material. In other examples, the disc seal 1512 can be constructed of other materials such as ethylene propylene diene monomer (EPDM), silicone, and/or Viton®. Additionally or alternatively, a mechanical spring can be included to provide the disc preload force. The thrust bearing 1508 reduces rotational friction of the disc key 1510 while under the disc preload force. In some examples, the thrust bearing 1508 is a ball bearing. In other examples, other types of bearings and/or features can be used such as a roller thrust bearing, a thrust washer, a low friction washer, or low friction surfaces and treatments.

To prevent the fixed disc 818 from rotating within the bore 816, the fixed disc 818 includes anti-rotational features that engage with corresponding anti-rotational features of the bore 816 of the piston 512. For example, in FIG. 18, the anti-rotational features of the fixed disc are flattened sides 1802 on an outer peripheral edge 1800 of the fixed disc 818 and the anti-rotational features of the bore 816 are flattened surfaces 1804 that engaged each other to prevent rotation of the fixed disc 818. As such, the fixed disc 818 and the piston 512 are keyed together. This prevents the fixed disc 818 from rotating in the piston 512. In some examples, the fixed disc 818 is symmetrical with a constant thickness. In other examples, the fixed disc 818 can include other shaped anti-rotational or key features (e.g., protrusions) and/or can be non-symmetrical and/or of varying thickness.

Referring back to FIG. 17, the cap 1514 has a passageway 1710 (e.g., a channel, an opening) that is exposed to the fluid in the first chamber 516 (FIG. 5). Fluid can flow through the passageway 1710 and into the openings 1516 in the fixed disc 818. Similarly, the radial openings 1530, 1532 are exposed to fluid in the second chamber 518 (FIG. 5) and is received in the notches 1518 of the rotatable disc 820. However, as shown in FIGS. 18 and 19, the notches 1518 in the rotatable disc 820 are offset from or do not overlap with the openings 1516 in the fixed disc 818 in the axial direction. As such, the openings 1516 in the fixed disc 818 are blocked by the rotatable disc 820 (e.g., the second face 1708 of the rotatable disc 820), which blocks or prevents fluid flow through the fixed disc 818 and the rotatable disc 820. This prevents fluid flow across the piston 512 between the first and second chambers 516, 518.

As shown in FIG. 16, when the valve 520 is in the closed position, the first stop bolt 1500 and/or the first stop O-ring 1504 is/are engaged with an end 1600 (e.g., a stop surface) of the first radial opening 1530. This limits or prevents the valve rod 538 from being rotated further in the counter-clockwise direction (when viewed from FIGS. 18 and 19). As such, this forms a stop when the valve 520 is in the closed state. The first stop O-ring 1504 provides a cushion against the end 1600. The second stop O-ring 1504 (FIG. 15) and/or the second stop bolt 1502 (FIG. 15) are similarly engaged with an end of the second radial opening 1532.

Figure 22:
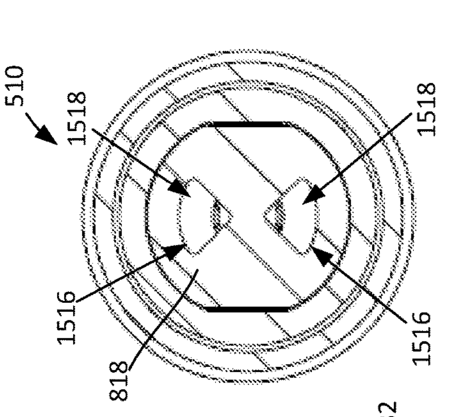
FIG. 22 is a cross-sectional view of the example piston assembly taken along lines E-E of FIG. 20 showing the example openings in the example fixed disc.
Figure 23:
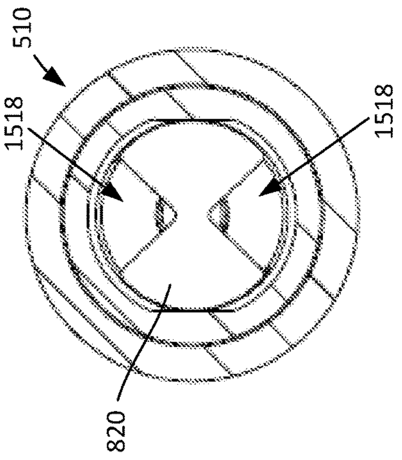
FIG. 23 is a cross-sectional view of the example piston assembly taken along lines F-F of FIG. 20 showing the example rotatable disc in an open position.
Figure 21:
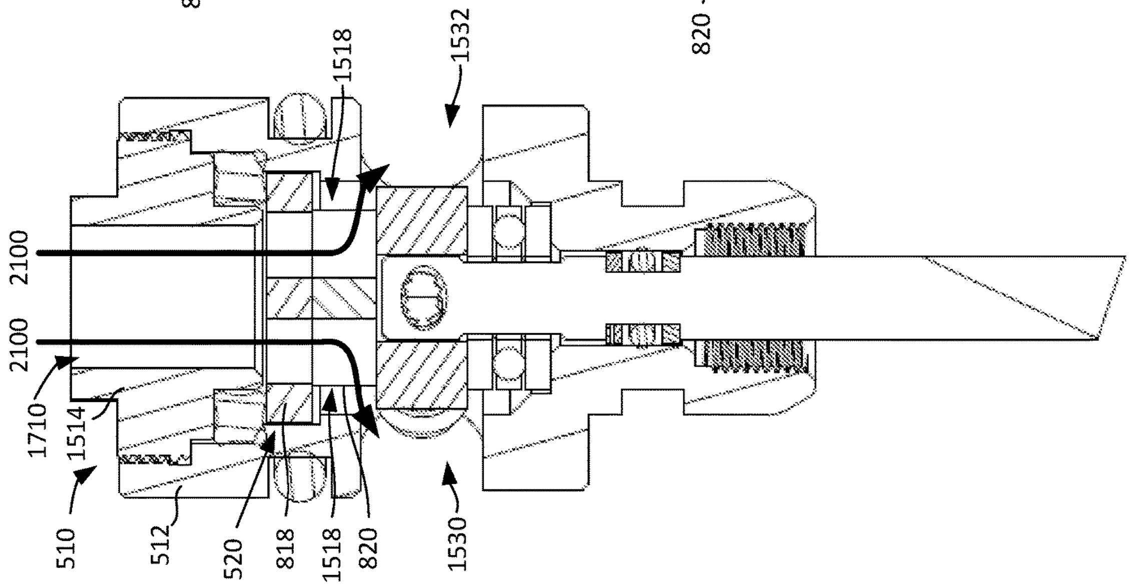
FIG. 21 is a cross-sectional view of the example piston assembly and the example shaft taken along lines D-D of FIG. 20 showing the example rotary valve in the open state.
Figure 20:
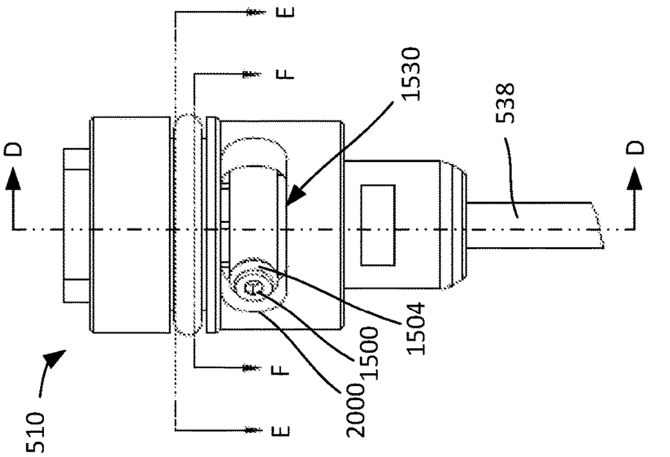
FIG. 20 is a side view of the example piston assembly and the example shaft of FIGS. 14 and 15 in which the example rotary valve is in an open state.

FIGS. 20-23 are similar views of the piston assembly 510 and the valve rod 538 as FIGS. 16-19 but showing the valve 520 in the open state. In particular, FIG. 20 is a side view of the piston assembly 510 coupled the valve rod 538, FIG. 21 is a cross-sectional view taken along line D-D of FIG. 20, FIG. 22 is a cross-sectional view taken along line E-E of FIG. 20, and FIG. 23 is a cross-sectional view taken along line F-F of FIG. 20. The valve rod 538 has been rotated about a quarter turn (e.g., 90°) by the motor assembly 220 (FIG. 2). As shown in FIGS. 22 and 23, the notches 1518 in the rotatable disc 820 are at least partially overlapping with the openings 1516 in the fixed disc 818 in the axial direction. As such, fluid can flow in the axial direction through the openings 1516 in the fixed disc 818 and between the first and second chambers 516, 518 (FIG. 5). As shown in FIG. 21, the notches 1518 of the rotatable disc 820 are aligned (in a radial direction) with the first and second radial openings 1530, 1532 in the piston 512. An example flow path 2100 is shown in FIG. 21. As shown, during a contraction of the seat post 200, fluid can flow from the first chamber 516 (from above the piston 512), through the passageway 1710 in the disc cap 1514, across the fixed disc 818 and the rotatable disc 820, and through the radial openings 1530, 1532 and into the second chamber 518 (below the piston 512). Fluid can also flow in the reverse direction during expansion of the seat post 2004. Therefore, when the valve 520 is in the open state, fluid can flow across the piston 512 between the first and second chambers 516, 518. As disclosed above, the openings 1516 in the fixed disc 818 are aligned or oriented in the axial direction. As such, fluid flows in the axial direction through the openings 1516 and across the fixed disc 818 when the valve 520 is in the open state.

As shown in FIG. 20, the first stop bolt 1500 and/or the first stop O-ring 1504 is engaged with an opposite end 2000 of the first radial opening 1530. The second stop bolt 1502 (FIG. 15) and/or the second stop O-ring 1506 (FIG. 15) is similarly engaged with an end of the second radial opening 1532 (FIG. 15). This limits or prevents the valve rod 538 from being rotated further in the clockwise direction (when viewed from FIGS. 22 and 23). As such, the interface between the first and second stop bolts 1500, 1502 and the first and second radial openings 1530, 1532 form the rotational limits of the rotatable disc 820. In this example, the rotatable disc 820 is rotatable about a quarter turn (e.g., 90°) between the open and closed positions. However, in other examples, the piston assembly 510 can be configured so that the rotatable disc 820 is rotated a different rotational amount to open/close the valve 520. For example, the size of the radial openings 1530, 1532 can be increased or decreased to enable a greater or smaller amount of rotation.

As shown in FIGS. 18 and 22, the openings 1516 in the fixed disc 818 are sector shaped. In other examples, the openings 1516 can be shaped differently (e.g., circular, triangular, etc.). Further, while in the illustrated example the fixed disc 818 has two openings 1516, in other examples, the fixed disc 818 may only have one opening, or may have more than two openings (e.g., three, four, five, etc.). Also, the openings 1516 can be different shapes or sizes. In some examples, the openings 1516 may instead be formed by notch(es) in the fixed disc 818, similar to the rotatable disc 820. Similarly, while the rotatable disc 820 has two notches 1518, in other examples, the rotatable disc 820 can have more or fewer notches and/or the notches can instead be formed by openings or other types of flow passageways. While in this example the fixed disc 818 is above the rotatable disc 820, in other examples, the piston assembly 510 can be arranged such that the rotatable disc 820 is above the fixed disc 818.

As can be appreciated, the valve 520 is a non-volume displacing valve. This means the volume of fluid (e.g., air) in the first chamber 516 (FIG. 5) does not change between the open and closed valve states, and the volume of fluid in the second chamber 518 (FIG. 5) does not change between the open and closed valve states. This reduces the amount of power used by the motor 522 (FIG. 5) to open or close the valve 520 compared to other types of valves that require higher power to overcome a biasing force acting against the flow control member of the valve. Further, the example valve 520 uses hardened discs instead of polymer-type seals that become sticky and require a cracking force to open. Further, this type of valve is self-latching due to inherent friction in the system. In other words, once the valve 520 is in the open or closed state, the motor 522 can be deactivated and the valve 520 remains in the same state. As such, power is not required to stay in one state or the other. This helps preserve battery life, because battery power is only used to open and close the valve 520.

As disclosed above, the motor 522 (FIG. 5) is controlled by the processor circuitry 410 (FIG. 4) of the control module 222 (FIG. 2). The processor circuitry 410 of the control module 222 can activate the motor 522 to rotate the rotatable disc 820 between the open position and the closed position. In some examples, the motor assembly 220 (FIG. 2) does not use a positional encoder. Instead, the processor circuitry 410 can use the motor current draw to determine when the valve 520 is in the open or closed states. In some examples, the processor circuitry 410 can determine when to deactivate the motor 522 based on a sensed change (e.g., an increase) in current to the motor 522. For example, at rest and unactuated, the valve 520 remains in the closed state (FIGS. 47-50). When a rider presses the seat post actuation button on the handlebars 118 (FIG. 1), the processor circuitry 410 applies voltage to the motor 522 and the motor 522 draws the current needed to open the valve 520. When the first and second stop O-rings 1504, 1506 and/or the first and second stop bolts 1500, 1502 contact the ends of the radial openings 1530, 1532, this prevents further rotation of the valve rod 538, and the motor 522 begins to draw more electrical current. The processor circuitry 410 senses the increase in draw of electrical current and, in response to this sensed increase, turns off or deactivates the motor 522 (e.g., ceases power to the motor 522). In some examples, the processor circuitry 410 senses the increase and deactivates the motor 520 prior to a stall current, which protects the parts of the motor assembly 220 from over torquing and overheating of the motor 522, as well as conserves battery energy. The valve 520 remains in the open state by its previously discussed latching function. When the valve 520 is open, the seat post 200 can be contracted to lower the seat 110. In some examples, the motor 522 rotates in a closing direction with a positive voltage and in the opening direction with a negative voltage, or vice versa. When the rider releases the seat post actuation button 117, the processor circuitry 410 applies an opposite voltage to the motor 522 and the motor 522 draws the current it needs to begin moving back to a closed state. When the first and second stop O-rings 1504, 1506 and/or the first and second stop bolts 1500, 1502 contact the ends of the radial openings 1530, 1532, the motor 522 again begins to draw more electrical current. The processor circuitry 410 senses the increased draw in electrical current and turns off or deactivates the motor 522. The cycle is complete with the valve 520 in a closed state. Therefore, when the rider presses the seat post actuation button 117, the motor 522 is activated to open the valve 520 and then deactivated (while the valve 520 remains in the open state), and when the rider releases the seat post actuation button 117, the motor 522 is activated to close the valve 520 and then deactivated (while the valve 520 remains in the closed state). As such, in this example, a positional encoder is not used. This reduces complexity and costs compared to known seat post motor systems. However, in other examples, a positional encoder or position sensor may be used to determine when to stop the motor 522 at the open and closed positions. In such an example, the stop bolts 1500, 1502 may not be used. In some examples, current ripples in the motor current may be counted or used to determine open stop, closed stop, or intermediate positions. In some examples, magnetic sensing may also be used to determine open stop, closed stop, or intermediate positions.

Figure 24:
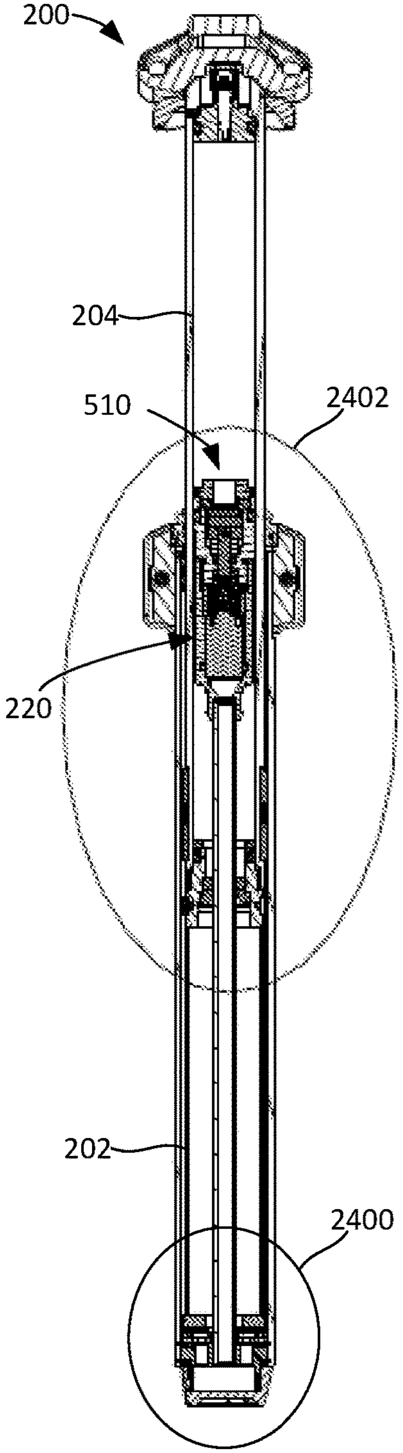
FIG. 24 is a cross-sectional view of the example height adjustable seat post similar to FIG. 2 but with the example motor assembly installed in an example upper tube with the example piston assembly.
Figure 25:
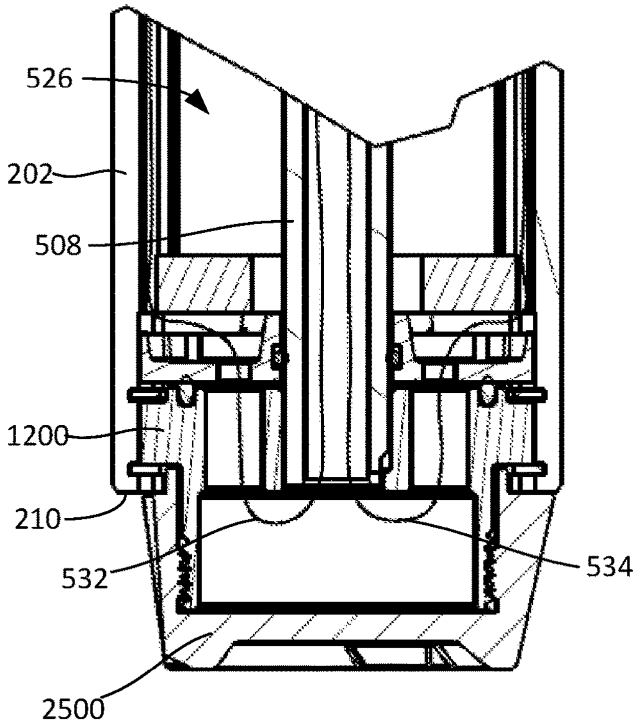
FIG. 25 is an enlarged view of the lower callout of FIG. 24 showing a lower end of an example lower tube of the example height adjustable seat post.

While in the example of FIGS. 2-23 the motor assembly 220 is coupled to and/or otherwise disposed on the lower end 210 of the lower tube 202, in other examples, the motor assembly 220 can be adjacent the piston assembly 510 inside the upper tube 204. For example, FIG. 24 is a cross-sectional view of the seat post 200 in which the motor assembly 220 is coupled to or incorporated into the piston assembly 510. Therefore, the motor assembly 220 is disposed inside the upper tube 204 around the overlap region of the upper and lower tubes 202, 204. FIG. 25 is an enlarged view of the callout 2400 of FIG. 24 showing the lower end 210 of the lower tube 202. In this example, a cap 2500 is coupled to the body 1200. The cap 2500 may not be air-tight so that the third chamber 526 in the lower tube 202 can be vented to the atmosphere. As shown in FIG. 25, the first and second wires 532, 534 extend around the bottom end of the shaft 508 and then into the shaft 508 and up to the motor assembly 220 (FIG. 24).

Figure 26:
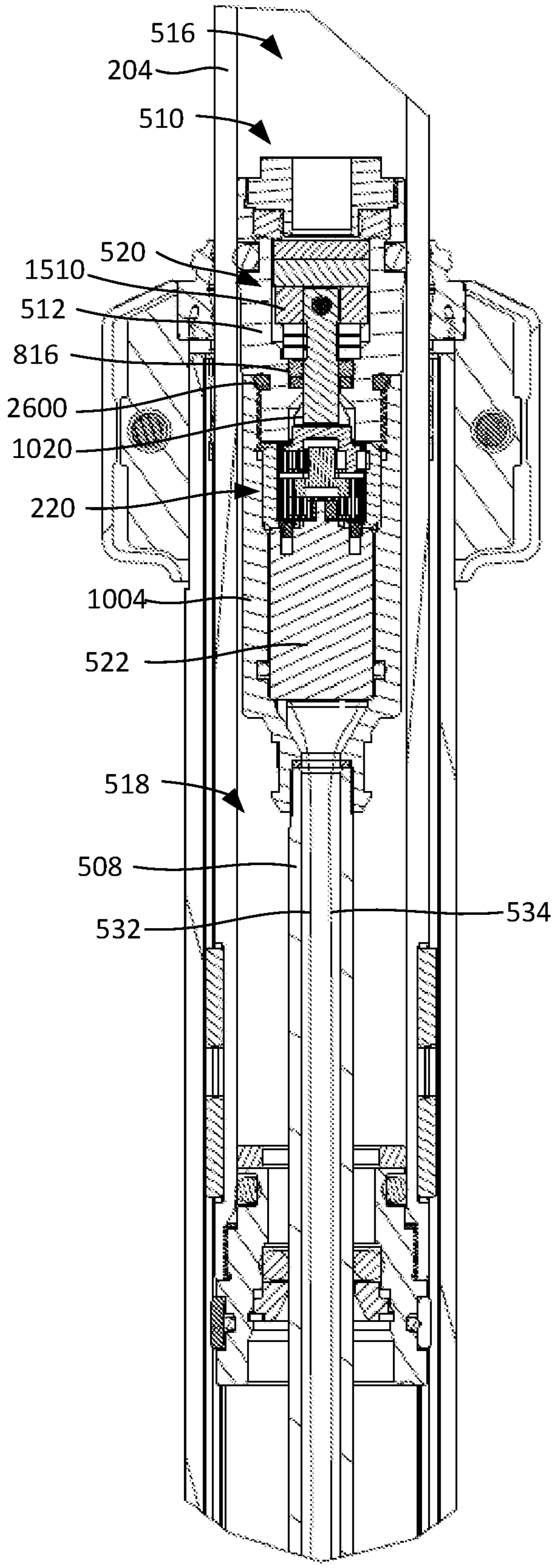
FIG. 26 is an enlarged view of the upper callout of FIG. 24 showing the example piston assembly and the example motor assembly in the example upper tube.

FIG. 26 is an enlarged view of the callout 2402 of FIG. 24 showing the piston assembly 510 and the motor assembly 220 in the upper tube 204. The motor assembly 220 is coupled to the piston 512 and disposed in the upper tube 204. In particular, in this example, the motor housing 1004 is coupled to the top end of the shaft 508, and the piston 512 is coupled (e.g., threadably coupled) to a top of the motor housing 1004. As such, the piston 512 is above the motor assembly 220 in the upper tube 204. The motor 522 and the other planetary gear parts are disposed in the motor housing 1004. The motor 522 and the other motor assembly parts are exposed to atmospheric pressure via the shaft 508. In the illustrated example, the valve rod 538 is relatively short and extends between the second carrier 1020 and the disc key 1510. The valve rod seal 826 and a valve motor seal 2600 isolate the atmospheric pressure in the motor assembly 220 from pressurized gas in the first chamber 516 (the positive chamber) and the second chamber 518 (the negative chamber). The first and second wires 532, 534 extend through the shaft 508 and into the motor housing 1004 and are electrically connected to the motor 522. The rest of the parts of the valve 520 and the motor assembly 220 are substantially the same as disclosed above and are not repeated herein.

In the examples disclosed above, the motor assembly 220 is located in the atmospheric pressure region. However, in other examples, the motor assembly 220 can be located in the positive or negative pressure regions (e.g., in the first or second chambers 516, 518). In some examples, the motor assembly 220 and/or the wires 532, 534 may have a sealing surface such that they are partially in the positive or negative pressure regions on one side of a seal, and partially in an atmospheric pressure region on the other side of the seal. In some examples, the battery 404 and/or the control housing 402 can be installed in the positive or negative pressure regions. In some examples, instead of the motor 522, a solenoid can be used to control the valve 520.

In some examples disclosed herein, the power source for the seat post 200 is the battery 404 (FIG. 4), which can be easily removed by a user from the seat post 200, such as by pressing a release tab or button or sliding the battery 404 in a certain direction away from the control housing 402 (FIG.

Figure 27:
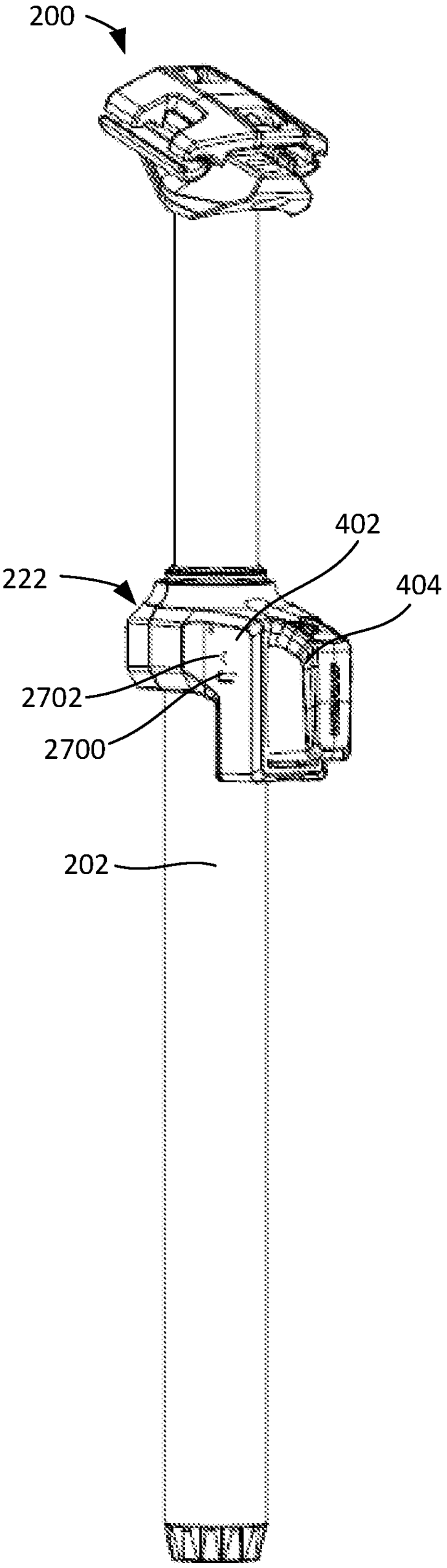
FIG. 27 is a perspective view of the example height adjustable seat post of FIG. 2 with an alternate shaped control housing and battery.
Figure 28:
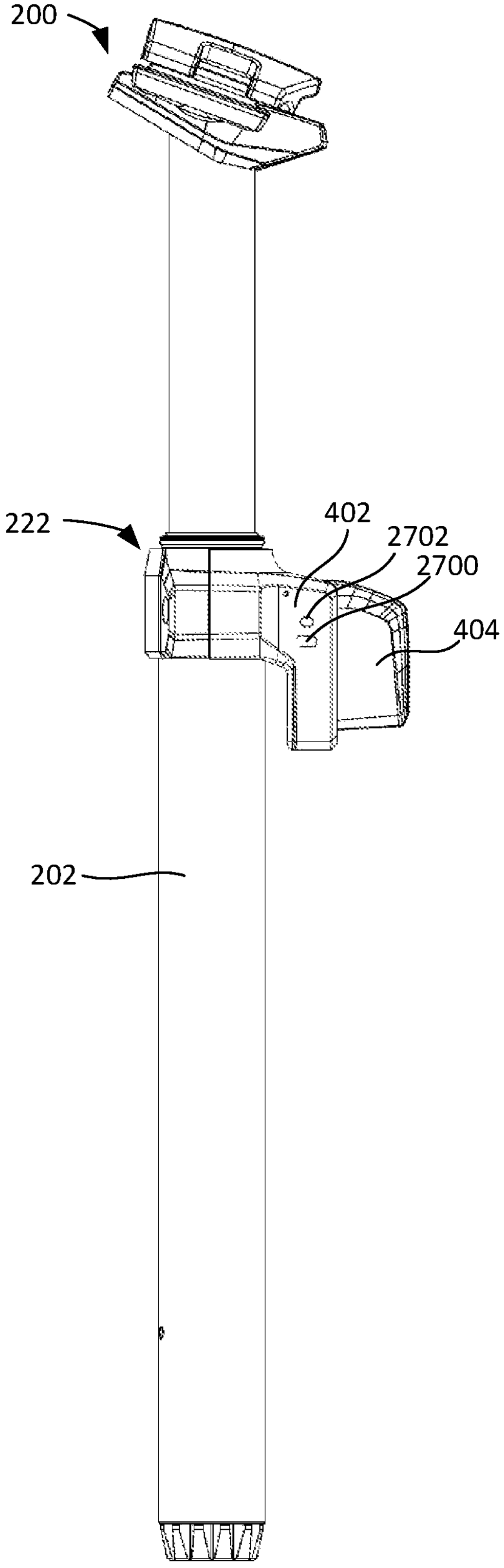
FIG. 28 is a side view of the example height adjustable seat post of FIG. 27.

4). However, in other examples, the battery 404 may be fixed to the seat post 200 in a manner that requires disassembly to remove (e.g., removing one or more screws). The battery 404 can have a charging port or contact surface for charging. The battery 404 can be located in various locations, such as the clamp 116 (FIG. 1), the collar 400 (FIG. 4), or the lower end 210 of the lower tube 202. The battery 404 may be oriented horizontally, vertically, or at an angle. For example, in FIG. 4, the battery 404 is oriented horizontally. FIGS. 27 and 28 show an example of the seat post 200 in which the battery 404 is oriented vertically. Also, in the example of FIGS. 27 and 28, the control housing 402 and the battery 404 are spaced from the lower tube 202. This reduces or eliminates interference with the clamp 116 (FIG. 1) when the seat post 200 is installed on the bicycle 100 (FIG. 1). In some examples, such as shown in FIGS. 27 and 28, the control module 222 includes a control button 2700 and a light 2702 (e.g., a light-emitting-diode (LED)). The button 2700 can be used to turn on/off the control module 222 and/or control various functions of the control module 222. The light 2702 can illuminate (e.g., blink, stay a solid color, switch colors, etc.) to indicate different modes or states of the control module 222. For example, the button 2700 may be pressed to initiate a pairing process of pairing the seat post assembly to seat post the actuation button 117 on the handlebars and/or other devices such as the bicycle computer 109. In response to the button 2700 being pressed, the light 2702 may flash indicating the pairing process has begun. Once the seat post assembly 200 and the wireless actuator 117 have been successfully paired, the light 2702 may flash rapidly, indicating to the rider that the pairing was successful. In some examples, the battery 404 may be located in-front of the lower tube axis or behind the lower seat tube axis. In other examples, the battery 404 can be located on either side of the lower tube axis such that that the center plane of the bicycle 100 does not intersect the battery 404. The battery 404 may also be mounted remote from the seat post 200 and connected to the seat post 200 by electrical wires (e.g., one or more wires extending through or along the frame 102). The battery 404 may be charged by wire or wirelessly.

As can be appreciated, the example valves or motor assemblies disclosed herein do not require position encoders as seen in known dropper seat posts actuation systems. As such, the examples disclosed herein reduce complexity and costs associated with a height adjustable seat post. Further, the example valves disclosed herein are rotary valves that operate by rotating a rotatable disc to open/close the valve. This rotational motion does not affect the volume of the fluid (e.g., pressurized gas) in the first and second chambers 516, 518. Therefore, this type of non-volume displacing valve is advantageous because it requires relatively low power to change the valve state. This type of valve is also advantageous because it is self-latching, meaning the valve remains in the open or closed state when the motor is deactivated. This reduces power consumption of the motor assembly.

While the example pistons assemblies, valves, and motor assemblies disclosed herein are described in connection with seat posts having a pneumatic platform, the examples disclosed herein can also be used in connection with hydraulic platforms. For example, instead of having pneumatic chambers filled with pressurized gas, the chambers 516, 518 can be filled with a hydraulic fluid, such as oil. Also, while the examples disclosed herein utilize a battery in the control module as the power supply to activate the motor, in other examples, the motor can be activated from another power supply, such as an electric bicycle battery or from another battery attached to the bicycle.

The example piston assemblies, valves, and motor assemblies can also be used in other types of bicycle components. For example, any of the example piston assemblies, valves, and motor assemblies can be used in suspension components (e.g., a shock absorber, a front fork). A suspension component often includes first and second tubes arranged in a telescopic arrangement. The example piston assemblies and valves disclosed herein can be used as a damper or a spring component to control the flow of fluid between two chambers in the tube(s).

Example systems, apparatus, and articles of manufacture for bicycles (and/or other vehicles) are disclosed herein. Examples and combinations of examples disclosed herein include the following:

Example 1 is a height adjustable seat post for a bicycle. The height adjustable seat post includes an upper tube and a lower tube configured in a telescopic arrangement. The lower tube is to be coupled to a frame of the bicycle, and the upper tube is to be coupled to a seat. The height adjustable seat post includes a piston in the upper tube. The piston divides the upper tube into a first chamber and a second chamber. The first and second chambers are filled with fluid. The height adjustable seat post also includes a valve including a fixed member and a rotatable member forming a face seal between a first face of the fixed member and a second face of the rotatable member. The fixed disc has a fluid flow passageway. The rotatable disc is rotatable relative to the fixed disc between a closed position in which the rotatable member blocks the fluid flow passageway to prevent fluid flow between the first and second chambers and an open position to enable fluid flow through the fluid flow passageway and between the first and second chambers.

Example 2 includes the height adjustable seat post of Example 1, wherein the fixed member comprises a fixed disc and the rotatable member comprises a rotatable disc, the fixed disc and the rotatable disc are disposed in a bore defined in the piston.

Example 3 includes the height adjustable seat post of Example 2, wherein the fixed disc comprises anti-rotational features engaged with corresponding anti-rotational features of the bore to prevent the fixed disc from rotating in the piston.

Example 4 includes the height adjustable seat post of Example 3, wherein the anti-rotational features of the fixed disc comprises flattened edges on an outer peripheral edge of the fixed disc having flattened sides and the anti-rotational features of the bore comprises matching flattened surfaces engaged with the flattened surfaces of the fixed disc to prevent the fixed disc from rotating in the piston.

Example 5 includes the height adjustable seat post of any of Examples 2-3, wherein the fixed disc and the rotatable disc are constructed of ceramic.

Example 6 includes the height adjustable seat post of any of Examples 2-1-4, wherein the fixed disc and the rotatable disc are constructed of aluminum oxide.

Example 7 includes the height adjustable seat post of any of Examples 1-5, further including: a valve rod coupled to the rotatable disc; and a motor assembly including a motor to rotate the valve rod.

Example 8 includes the height adjustable seat post of Example 7, further including a disc key, the valve rod coupled to the disc key, the disc key mated with the rotatable disc via a keying feature such that rotation of the valve rod causes rotation of the rotatable disc.

Example 9 includes the height adjustable seat post of Example 8, wherein the piston has a radial opening, the valve rod and the disc key are coupled by a bolt, at least a portion of the bolt disposed in the radial opening.

Example 10 includes the height adjustable seat post of Example 9, wherein the radial opening forms a portion of a flow path between the first and second chambers when the rotatable disc is in the open position.

Example 11 includes the height adjustable seat post of any of Examples 7-10, wherein the motor assembly includes a gear reduction system between the motor and the valve rod.

Example 12 includes the height adjustable seat post of Example 11, wherein the gear reduction system is a two-stage planetary gear system.

Example 13 includes the height adjustable seat post of any of Examples 7-12, wherein the motor assembly is coupled to a lower end of the lower tube.

Example 14 includes the height adjustable seat post of Example 2, further including a shaft coupled to the lower tube and extending into the upper tube, the piston coupled to the shaft, the valve rod extending through the shaft between the piston and the motor assembly, the valve rod rotatable in the shaft.

Example 15 includes the height adjustable seat post of any of Examples 7-12, wherein the motor assembly is coupled to the piston and disposed in the upper tube.

Example 16 includes the height adjustable seat post of any of Examples 7-15, further including: a control module to activate the motor, the control module coupled to an outer surface of the lower tube; and electrical wires extending through the lower tube between the control module and the motor.

Example 17 includes the height adjustable seat post of Example 16, wherein the control module is coupled to the lower tube near an upper end of the lower tube.

Example 18 includes the height adjustable seat post of Examples 16 or 17, wherein the control module is configured to: activate the motor to rotate the rotatable disc between the open position and the closed position; and deactivate the motor based on a sensed changed in current to the motor.

Example 19 is a bicycle component including a first tube and a second tube configured in a telescopic arrangement and a piston in the first tube. The piston divides the first tube into a first chamber and a second chamber. The first and second chambers are filled with fluid. The bicycle component also includes a valve operable between a closed state in which the fluid is blocked from flowing across the piston between the first and second chambers to maintain the first and second tubes in position and an open state to enable the fluid to flow across the piston between the first and second chambers to enable the first and second tubes to move toward or away from each other. The valve includes a fixed disc and a rotatable disc disposed in a bore in the piston. The fixed disc has a fixed disc fluid flow passageway extending through the fixed disc in an axial direction. The rotatable disc is rotatable relative to the fixed disc to switch the valve between the closed state and the open state.

Example 20 includes the bicycle component of Example 19, wherein the fluid is pressurized gas.

Example 21 includes the bicycle component of Examples 19 or 20, wherein the pressurized gas in the first chamber biases the first and second tubes away from each other, and the pressurized gas in the second chamber biases the first and second tubes toward each other.

Example 22 includes the bicycle component of any of Examples 19-21, further including a retaining member coupled to the piston to apply an axial force on the fixed disc and the rotatable disc to provide a sealing engagement between the fixed disc and rotatable disc.

Example 23 includes the bicycle component of Example 22, further including a disc seal and a thrust bearing in the bore of the piston, the fixed disc and the rotatable disc disposed between the disc seal and the thrust bearing, the disc seal to provide a compressive spring force on the fixed disc, the thrust bearing to reduce rotational friction.

Example 24 includes the bicycle component of any of Examples 19-23, further including: a valve rod to rotate the rotatable disc; and a motor to rotate the valve rod.

Example 25 includes the bicycle component of any of Examples 24, further including a two-stage planetary gear system between the motor and the valve rod.

Example 26 includes the bicycle component of any of Examples 19-25, wherein the rotatable disc has a rotatable disc fluid flow passageway, and wherein, when the valve is in the close state, the rotatable disc fluid flow passageway does not overlap with the fixed disc fluid flow passageway in the axial direction, and when the valve is in the open state, the rotatable disc fluid flow passageway is at least partially overlapping with the fixed disc fluid flow passageway in the axial direction.

Example 27 includes the bicycle component of Example 26, wherein the fixed disc has two fixed disc fluid flow passageways, and the rotatable disc has two rotatable disc fluid flow passageways.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A height adjustable seat post for a bicycle, the height adjustable seat post comprising:

an upper tube and a lower tube configured in a telescopic arrangement, the lower tube to be coupled to a frame of the bicycle, the upper tube to be coupled to a seat;

a piston in the upper tube, the piston dividing the upper tube into a first chamber and a second chamber, the first and second chambers filled with fluid; and a valve including a fixed member and a rotatable member, and a retaining member to apply an axial force on the fixed member and the rotatable member, forming a face seal between a first face of the fixed member and a second face of the rotatable member, the fixed member having a fluid flow passageway, the rotatable member being rotatable relative to the fixed member between a closed position in which the rotatable member blocks the fluid flow passageway to prevent fluid flow between the first and second chambers and an open position to enable fluid flow through the fluid flow passageway and between the first and second chambers.

2. The height adjustable seat post of claim 1, wherein the fixed member comprises a fixed disc and the rotatable member comprises a rotatable disc, the fixed disc and the rotatable disc are disposed in a bore defined in the piston.

3. The height adjustable seat post of claim 2, wherein the fixed disc comprises anti-rotational features engaged with corresponding anti-rotational features of the bore to prevent the fixed disc from rotating in the piston.

4. The height adjustable seat post of claim 2, wherein the fixed disc and the rotatable disc are constructed of ceramic.

5. The height adjustable seat post of claim 1, further including:

a valve rod coupled to the rotatable disc; and a motor assembly including a motor to rotate the valve rod.

6. The height adjustable seat post of claim 5, further including a disc key, the valve rod coupled to the disc key, the disc key mated with the rotatable member via a keying feature such that rotation of the valve rod causes rotation of the rotatable member.

7. The height adjustable seat post of claim 5, wherein the motor assembly includes a gear reduction system between the motor and the valve rod.

8. The height adjustable seat post of claim 5, wherein the motor assembly is coupled to a lower end of the lower tube.

9. The height adjustable seat post of claim 8, further including a shaft coupled to the lower tube and extending into the upper tube, the piston coupled to the shaft, the valve rod extending through the shaft between the piston and the motor assembly, the valve rod rotatable in the shaft.

10. The height adjustable seat post of claim 5, wherein the motor assembly is coupled to the piston and disposed in the upper tube.

11. The height adjustable seat post of claim 5, further including:

a control module to activate the motor, the control module coupled to an outer surface of the lower tube; and electrical wires extending through the lower tube between the control module and the motor.

12. The height adjustable seat post of claim 11, wherein the control module is configured to:

activate the motor to rotate the rotatable disc between the open position and the closed position; and deactivate the motor based on a sensed change in current to the motor.

13. A bicycle component comprising:

a first tube and a second tube configured in a telescopic arrangement;

a piston in the first tube, the piston dividing the first tube into a first chamber and a second chamber, the first and second chambers filled with fluid; and a valve operable between a closed state in which the fluid is blocked from flowing across the piston between the first and second chambers to maintain the first and second tubes in position and an open state to enable the fluid to flow across the piston between the first and second chambers to enable the first and second tubes to move toward or away from each other, the valve including a fixed disc and a rotatable disc disposed in a bore in the piston, the fixed disc having a fixed disc fluid flow passageway extending through the fixed disc in an axial direction, the rotatable disc being rotatable relative to the fixed disc to switch the valve between the closed state and the open state.

14. The bicycle component of claim 13, wherein the fluid is pressurized gas.

15. The bicycle component of claim 14, wherein the pressurized gas in the first chamber biases the first and second tubes away from each other, and the pressurized gas in the second chamber biases the first and second tubes toward each other.

16. The bicycle component of claim 13, further including a retaining member coupled to the piston to apply an axial force on the fixed disc and the rotatable disc to provide a sealing engagement between the fixed disc and rotatable disc.

17. The bicycle component of claim 16, further including a disc seal and a thrust bearing in the bore of the piston, the fixed disc and the rotatable disc disposed between the disc seal and the thrust bearing, the disc seal to provide a compressive spring force on the fixed disc, the thrust bearing to reduce rotational friction.

18. The bicycle component of claim 13, further including:

a valve rod to rotate the rotatable disc; and a motor to rotate the valve rod.

19. The bicycle component of claim 18, further including a two-stage planetary gear system between the motor and the valve rod.

20. The bicycle component of claim 18, wherein the rotatable disc has a rotatable disc fluid flow passageway, and wherein, when the valve is in the close state, the rotatable disc fluid flow passageway does not overlap with the fixed disc fluid flow passageway in the axial direction, and when the valve is in the open state, the rotatable disc fluid flow passageway is at least partially overlapping with the fixed disc fluid flow passageway in the axial direction.

21. The bicycle component of claim 20, wherein the fixed disc has two fixed disc fluid flow passageways, and the rotatable disc has two rotatable disc fluid flow passageways.

* * * * *